(12) United States Patent
Ong

(10) Patent No.: US 8,786,806 B2
(45) Date of Patent: Jul. 22, 2014

(54) PIXELS HAVING EXTRA-PLANAR FRINGE FIELD AMPLIFIERS FOR MULTI-DOMAIN VERTICAL ALIGNMENT LIQUID CRYSTAL DISPLAYS

(75) Inventor: Hiap L. Ong, Warren, NJ (US)

(73) Assignees: Hiap L. Ong (TW); Kyoritsu Optronics Co., Ltd. (TW)

( * ) Notice: Subject to any disclaimer, the term of this patent is extended or adjusted under 35 U.S.C. 154(b) by 185 days.

(21) Appl. No.: 13/341,776

(22) Filed: Dec. 30, 2011

(65) Prior Publication Data
US 2012/0099051 A1 Apr. 26, 2012

Related U.S. Application Data

(60) Continuation of application No. 12/721,559, filed on Mar. 10, 2010, now Pat. No. 8,446,536, and a continuation-in-part of application No. 12/573,085, filed on Oct. 2, 2009, now Pat. No. 8,427,592, which is a continuation-in-part of application No. 11/751,454, filed on May 21, 2007, now Pat. No. 8,107,030, said application No. 12/721,559 is a continuation-in-part of application No. 11/751,454, filed on May 21, 2007, now Pat. No. 8,107,030, and a continuation-in-part of application No. 11/751,387, filed on May 21, 2007, now Pat. No. 7,956,958, which is a continuation-in-part of application No. 11/227,595, filed on Sep. 15, 2005, now Pat. No. 7,630,033, said application No. 12/721,559 is a continuation-in-part of application No. 12/492,098, filed on Jun. 25, 2009, now Pat. No. 8,040,472, which is a division of application No. 11/227,595, filed on Sep. 15, 2005, now Pat. No. 7,630,033.

(51) Int. Cl.
*G02F 1/1335* (2006.01)

(52) U.S. Cl.
USPC .............................. 349/108; 349/141; 349/37

(58) Field of Classification Search
USPC ............... 349/108, 106, 37, 42, 43, 129, 138, 349/139, 141, 143
See application file for complete search history.

(56) References Cited

U.S. PATENT DOCUMENTS 7,663,708 B2 * 2/2010 Wang et al. ..................... 349/37

* cited by examiner

*Primary Examiner* — Thoi Duong
(74) *Attorney, Agent, or Firm* — Silicon Valley Patent Group, LLC.; Edward S. Mao

(57) ABSTRACT

A multi-domain vertical alignment liquid crystal display that does not require physical features on the substrate (such as protrusions and ITO slits) is disclosed. Each pixel of the MVA LCD is subdivided into color components, which are further divided into color dots. Each pixel also contains extra-planar fringe field amplifiers that separate the color dots of a pixel. The voltage polarity of the color dots and extra-planar fringe field amplifiers are arranged so that fringe fields in each color dot causes multiple liquid crystal domains in each color dot. Specifically, the color dots and fringe field amplifying regions of the display are arranged so that neighboring polarized elements have opposite polarities.

20 Claims, 22 Drawing Sheets

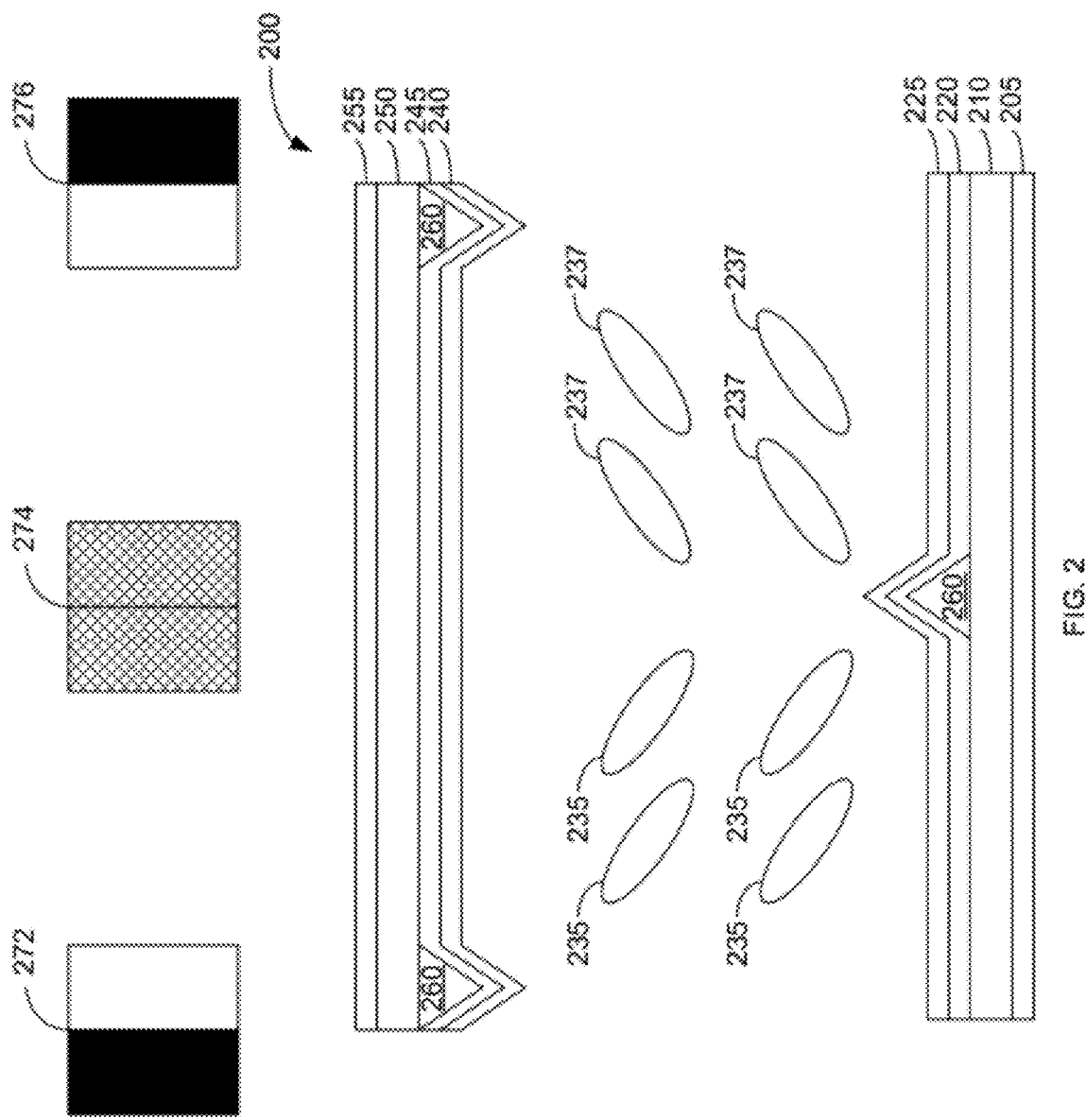

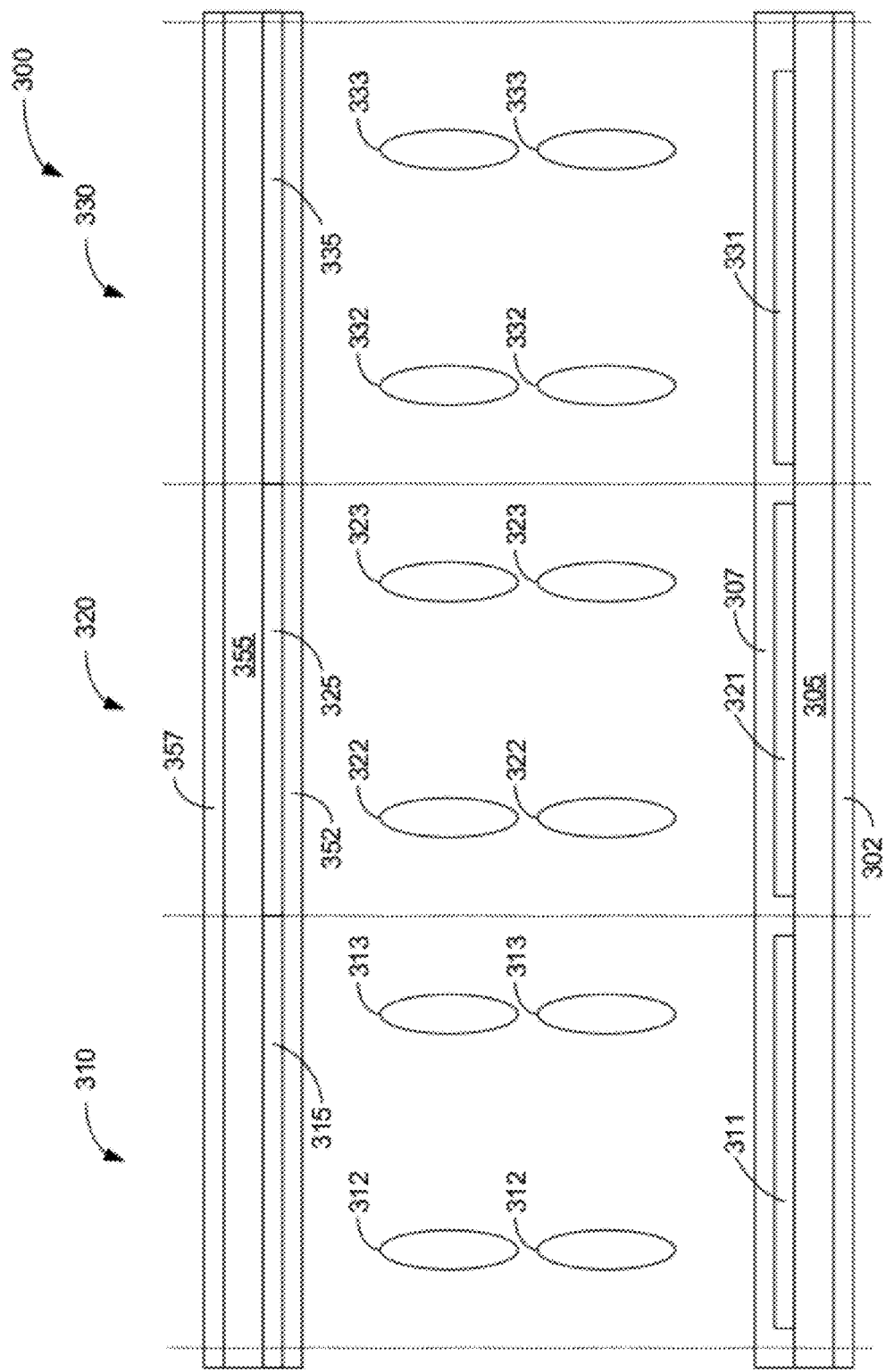

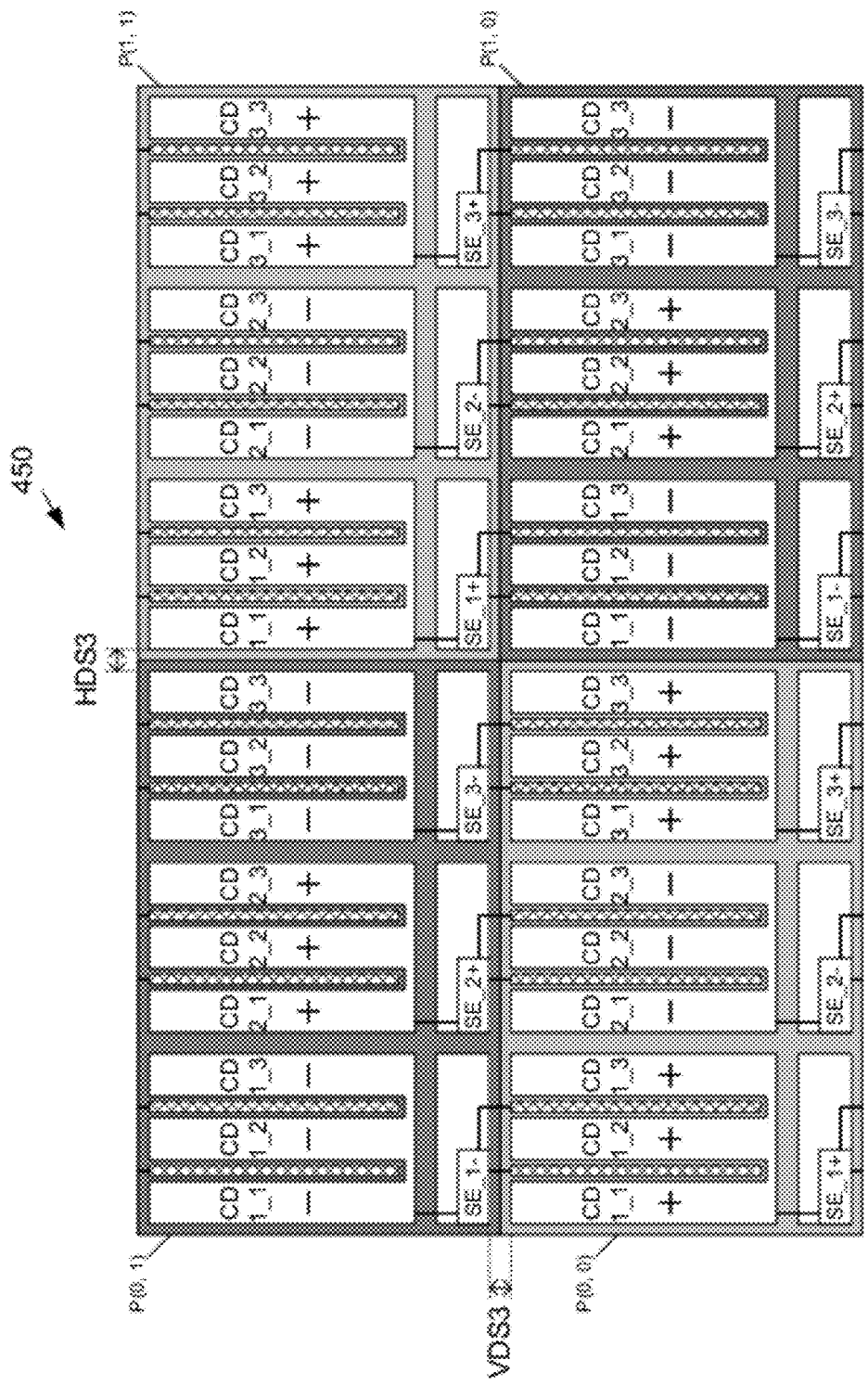

PIXELS HAVING EXTRA-PLANAR FRINGE FIELD AMPLIFIERS FOR MULTI-DOMAIN VERTICAL ALIGNMENT LIQUID CRYSTAL DISPLAYS

RELATED APPLICATIONS

The present application is a Continuation-In-Part of and claims the benefit of United States Utility patent application Ser. No. 12/573,085 entitled "Pixels having Fringe Field Amplifying Regions for Multi-Domain Vertical Alignment Liquid Crystal Displays" by Hiap L. Ong, filed Oct. 2, 2009, which is incorporated herein in its entirety by reference. United States Utility patent application Ser. No. 12/573,085, is also a Continuation-In-Part of and claimed the benefit of United States Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference.

The present application is also a Continuation-In-Part of and claims the benefit of United States Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference.

The present application is also a Continuation-In-Part of and claims the benefit of U.S. Utility patent application Ser. No. 11/751,387 (Publication serial number US 2009/00262271 A1), entitled "Large Pixel Multi-Domain Vertical Alignment Liquid Crystal Display Using Fringe Fields" by Hiap L. Ong, filed May 21, 2007, and is incorporated herein in its entirety by reference. U.S. Utility patent application Ser. No. 12/492,098 is a continuation-in-part of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

The present application is a Continuation-In-Part of and claims the benefit of U.S. Utility patent application Ser. No. 12/492,098 (Publication serial number US 2009/00262271 A1), entitled "Large Pixel Multi-Domain Vertical Alignment Liquid Crystal Display Using Fringe Fields" by Hiap L. Ong, filed Jun. 25, 2009, and is incorporated herein in its entirety by reference. U.S. Utility patent application Ser. No. 12/492,098 is a divisional of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawbacks of conventional twisted nematic LCDs are the very narrow viewing angle and low contrast ratio. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization is rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides an Amplified Intrinsic Fringe Field MVA LCD (AIFF MVA LCD) that does not require protrusions or ITO slits. Thus manufacturing of AIFF MVA LCDs in accordance with the present invention is less expensive than conventional MVA LCDs. Specifically, embodiments of the present invention use novel pixel designs that provide amplified intrinsic fringe fields to create the multiple domains in the AIFF MVA LCD. For example, in accordance with one embodiment of the present invention, pixels are sub-divided into color components having multiple color dots (CDs). In addition the pixels contain extra-planar fringe field amplifiers that lie in a different plane than the color dots. The extra-planar fringe field amplifiers are configured to have a first polarity when the color dot has a second polarity to amplify the fringe fields of the color dot.

In some embodiments of the present invention, a pixel has a first color component and a first extra-planar fringe field amplifier. The first color component includes a first first-component color dot and a second first-component color dot. The extra-planar fringe field amplifier is located between the first first-component color dot and the second first-component color dot. However, the first first-component color dot and the second first-component color dot are on a first plane, while the extra-planar fringe field amplifier lies in a second plane. Generally, the extra-planar fringe field amplifier is configured to receive polarity from outside the pixel.

The pixel can also include a second color component and a second extra-planar fringe field amplifier. The second component includes a first second-component color dot and a second second-component color dot. The second extra-planar fringe field amplifier, which lies in the second plane, is located between the first second-component color dot and the second second-component color dot. Furthermore, the pixel includes a first switching element coupled to the first color component and a second switching element coupled to the second color component. In a specific embodiment of the present invention the first switching element is configured to have a first polarity when the second switching element is configured to have a second polarity.

The present invention will be more fully understood in view of the following description and drawings.

BRIEF DESCRIPTION OF THE DRAWINGS

FIG. 2 is an illustration of a pixel of a conventional multi-domain vertical alignment LCD.

FIGS. 3(a)-3(b) illustrate a multi-domain vertical alignment liquid crystal display in accordance with one embodiment of the present invention.

FIGS. 4(a)-4(c) illustrate a pixel design in accordance with one embodiment of the present invention.

DETAILED DESCRIPTION

As explained above, conventional MVA LCDs are very expensive to manufacture due to the use of physical features, such as protrusions or ITO slits, for creating the multiple domains of each pixel. However, MVA LCDs in accordance with the principles of the present invention use fringe fields to create multiple-domains and do not require the use of physical features (such as protrusions or ITO slits) on the substrate. Furthermore, without the requirement of physical features the difficulty of aligning the physical features of the top and bottom substrate is also eliminated. Thus, MVA LCDs in accordance with the present invention are higher yield and less expensive to manufacture than conventional MVA LCDs.

Figure 1A:
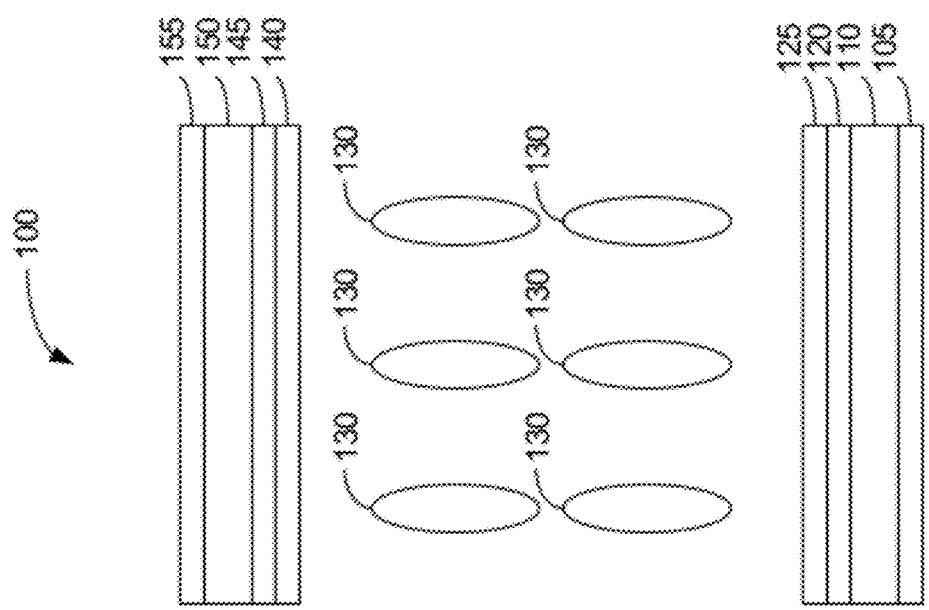
FIGS. 1(a)-1(c) are three illustrations of a pixel of a conventional single domain vertical alignment LCD.
Figure 1B:
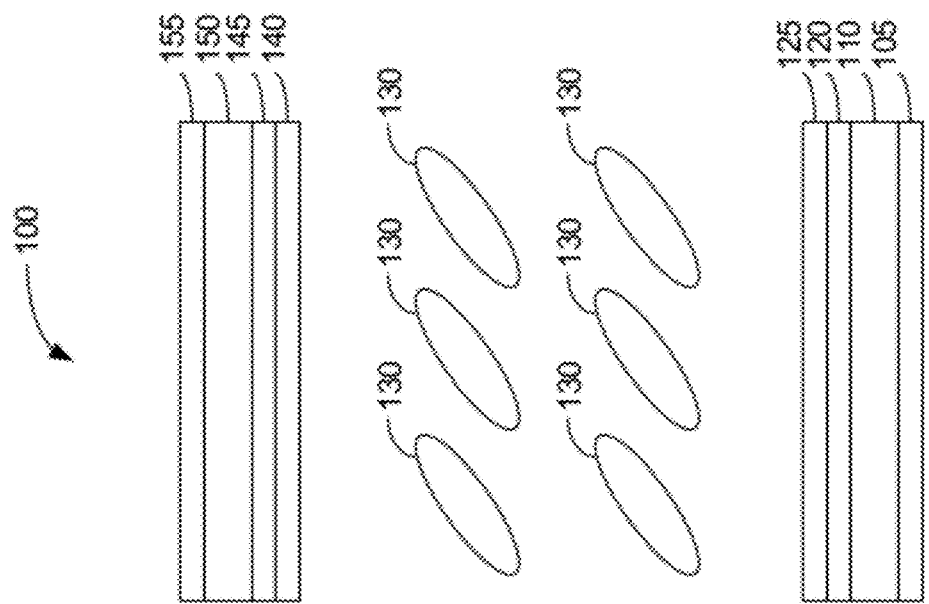
Figure 1C:
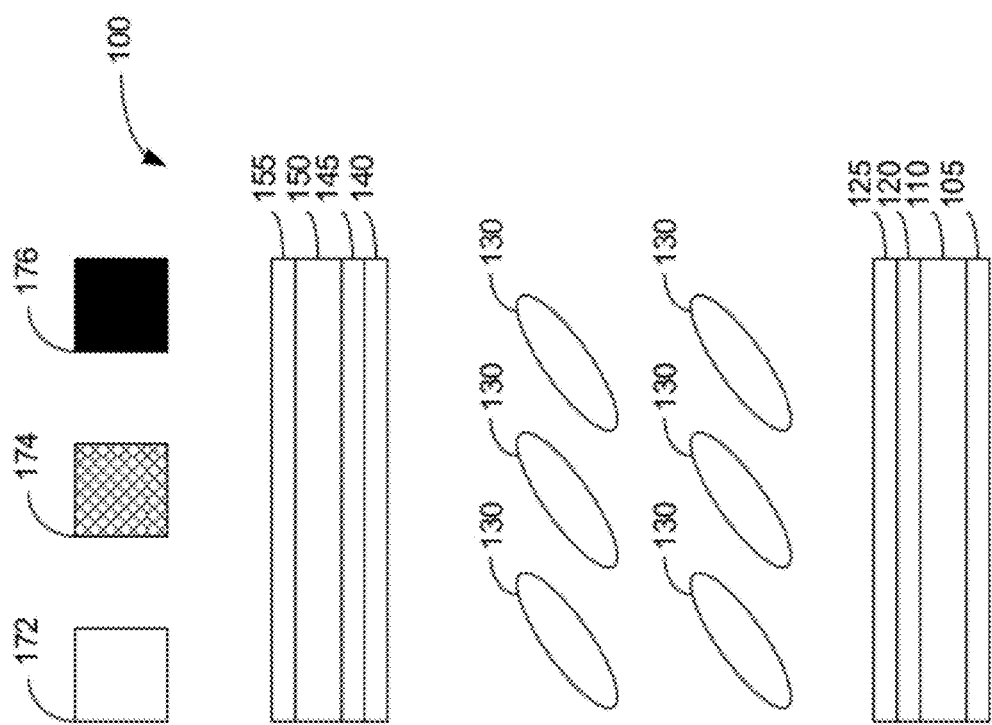
Figure 3B:
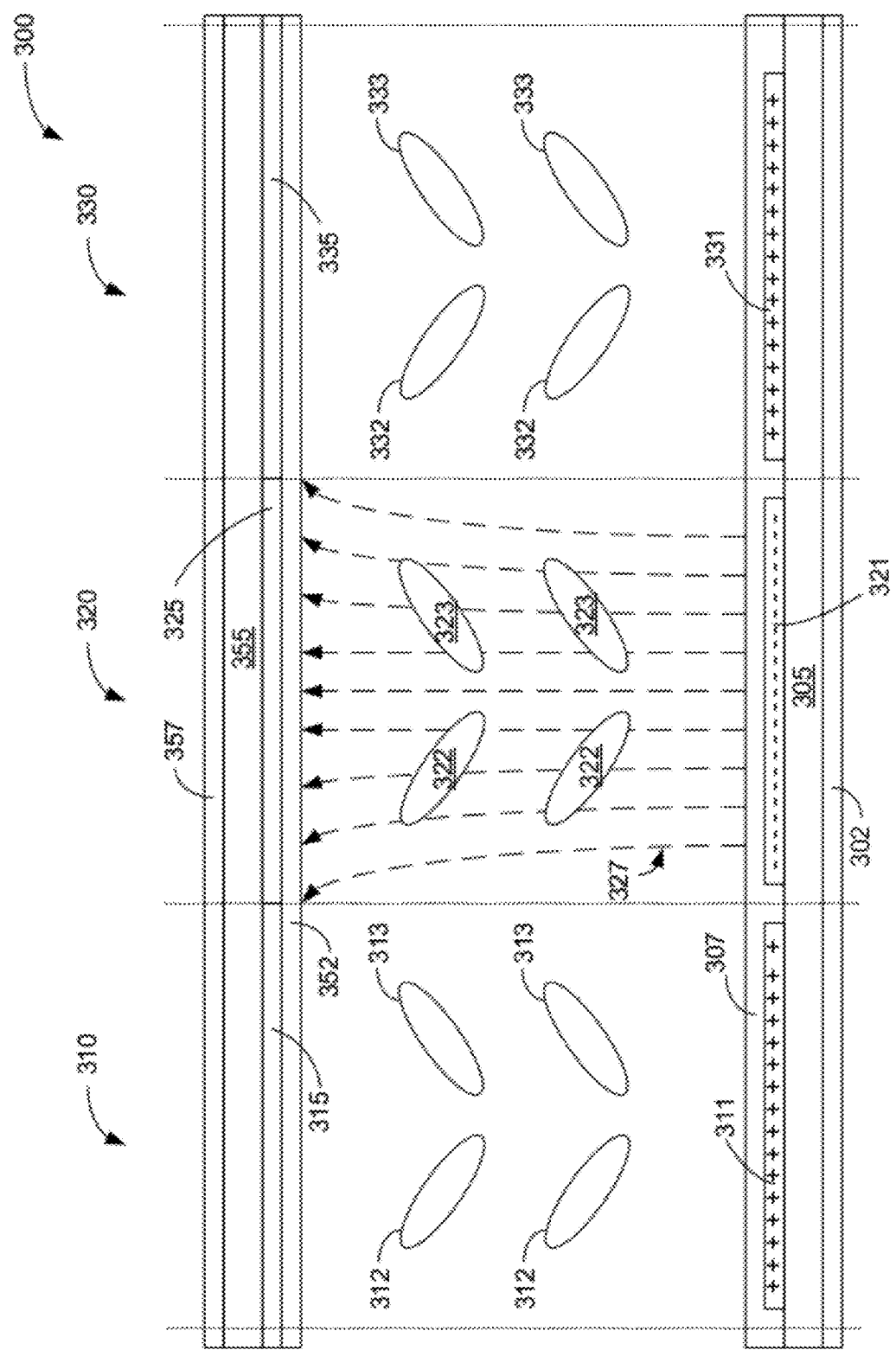

FIGS. 3(a) and 3(b) illustrate the basic concept used in accordance with the present invention to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 312 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 μm. Therefore, for large pixel LCDs a novel pixel division method is used to achieve multi-domain pixels. Specifically, for color LCDs, pixels are divided into color components. Each color component controlled by a separate switching device, such as a thin-film transistor (TFT). Generally, the color components are red, green, and blue. In accordance with the present invention, the color components of a pixel are further divided into color dots.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. Various switching element driving schemes are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels in accordance with embodiments of the present invention include various key components arranged in novel arrangements to achieve high quality low cost display units. For example, pixel can include color components, color dots, fringe field amplifying regions (FFAR), switching elements, device component areas, and associated dots. In particular, the present invention introduces novel extra-planar fringe fiend amplifiers.

The device component area encompasses the area occupied by the switching elements and/or storage capacitor as well as the area that was used to manufacture the switching elements and/or storage capacitors. For clarity, a different device component area is defined for each switching element.

Associated dots and fringe field amplifying regions are electrically polarized areas that are not part of the color components. In many embodiments of the present invention, associated dots covers the device component areas. For these embodiments, the associated dots are manufactured by depositing an insulating layer over the switching element and/or storage capacitors. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. Generally, a black matrix layer is added to form a light shield for the associated dot. However, in some embodiments of the present invention, a color layer is added to the associated dot to improve the color performance or to achieve a desired color pattern or shading. In some embodiments of the present invention, the color layer is manufactured on top or underneath the switching element. Other embodiments may also place a color layer on top of the glass substrate of the display.

In other embodiments of the present invention, the associated dot is an area independent of the switching elements. Furthermore, some embodiments of the present invention have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. In some embodiments of the present invention, the black matrix can be fabricated on the ITO glass substrate side to simplify the fabrication process. The additional associated dots improve the effective use of display area to improve the aperture ratio and to form the multiple liquid crystal domains within the color dots. Some embodiments of the present invention use associate dots to improve color performance. For example, careful placement of associated dots can allow the color of nearby color dots to be modified from the usual color pattern.

Fringe field amplifying regions (FFARs) are more versatile than associated dots. Specifically, fringe field amplifying regions may have non-rectangular shapes, although generally, the overall shape of the fringe field amplifying regions can be divided into a set of rectangular shapes. Furthermore, fringe field amplifying regions extend along more than one side of a color dot. In addition, fringe field amplifying regions may be used in place of associated dots in some embodiments of the present invention. Specifically, in these embodiments the fringe field amplifying region covers the device component areas but also extend along more than one side of color dots adjacent to the device component areas.

Extra-planar fringe field amplifiers (EPFFAs) are polarized structures that are on a different horizontal plane than the color dots of a pixel. Generally, the extra-planar fringe field amplifiers (EPFFAs) are placed near the edges of the color dots to amplify the fringe field of the color dots. One benefit of using extra-planar fringe field amplifiers is that the color dots can be placed closer together to improve the brightness of a display. Extra-planar fringe fiend amplifiers are described in detail below.

In general, the color dots, device component areas, and associated dots are arranged in a grid pattern and are separated from adjacent neighbors by a horizontal dot spacing HDS and a vertical dot spacing VDS. When fringe field amplifying regions are used in place of associated dots, part of the fringe field amplifying regions would also fit in the grid pattern. In some embodiments of the present invention multiple vertical dot spacings and multiple horizontal dot spacings may be used. Each color dot, associated dot, and device component area has two adjacent neighbors (e.g. color dots, associated dots, or device component areas) in a first dimension (e.g. vertical) and two adjacent neighbors in a second dimension (e.g. horizontal). Furthermore, two adjacent neighbors can be aligned or shifted. Each color dot has a color dot height CDH and a color dot width CDW. Similarly, each associated dot has an associated dot height ADH and an associated dot width ADW. Furthermore, each device component area has device component area height DCAH and a device component area width DCAW. In some embodiments of the present invention, color dots, associated dots and device component areas are the same size. However in many embodiments of the present invention color dots, associated dots and device component areas could be of different size or shapes. For example in many embodiments of the present invention associated dots have a smaller height than color dots. In many applications, the height for the color dots is increased to improve the stability of the MVA structure and improve optical transmission to increase the display brightness.

Figure 4A:
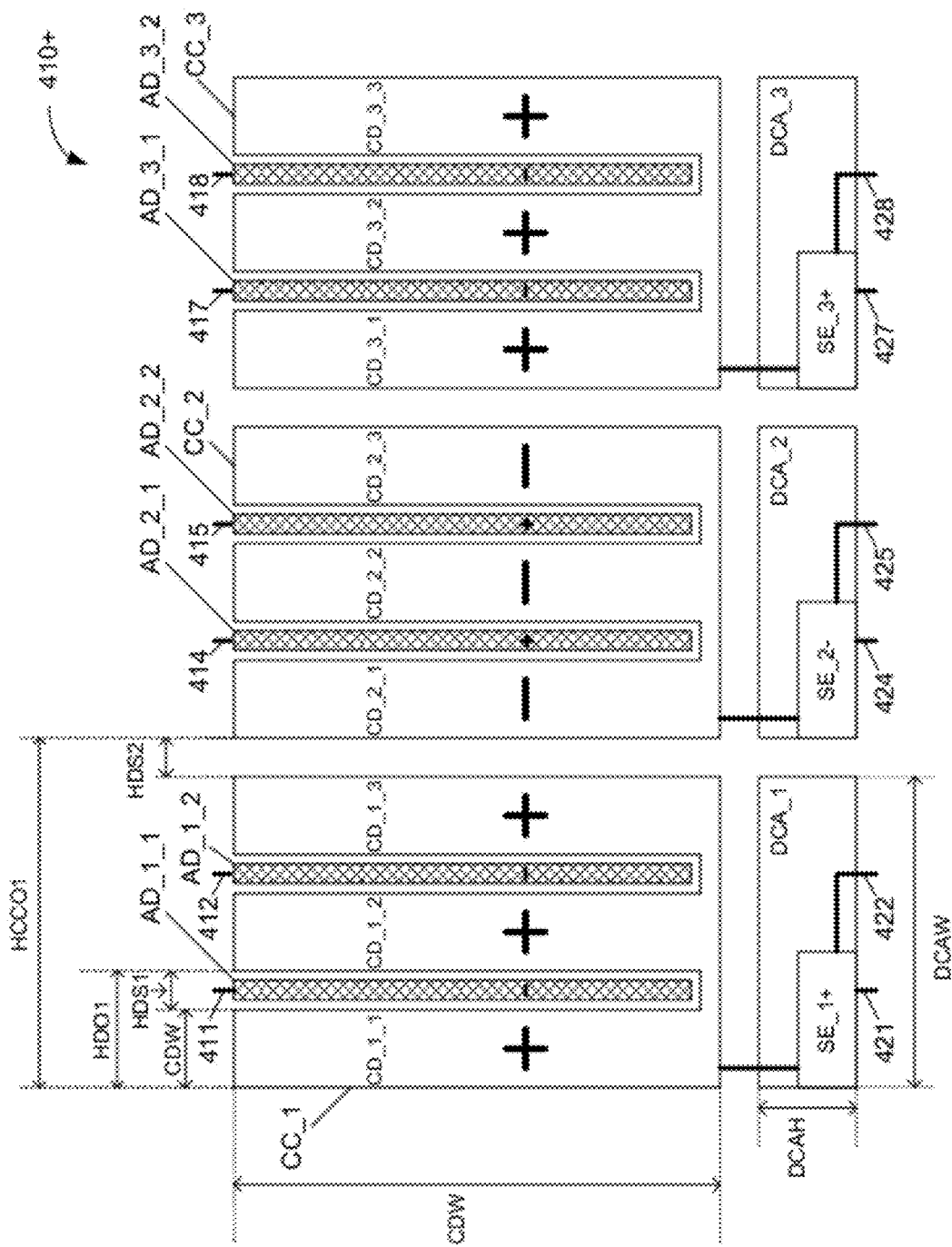
Figure 4B:
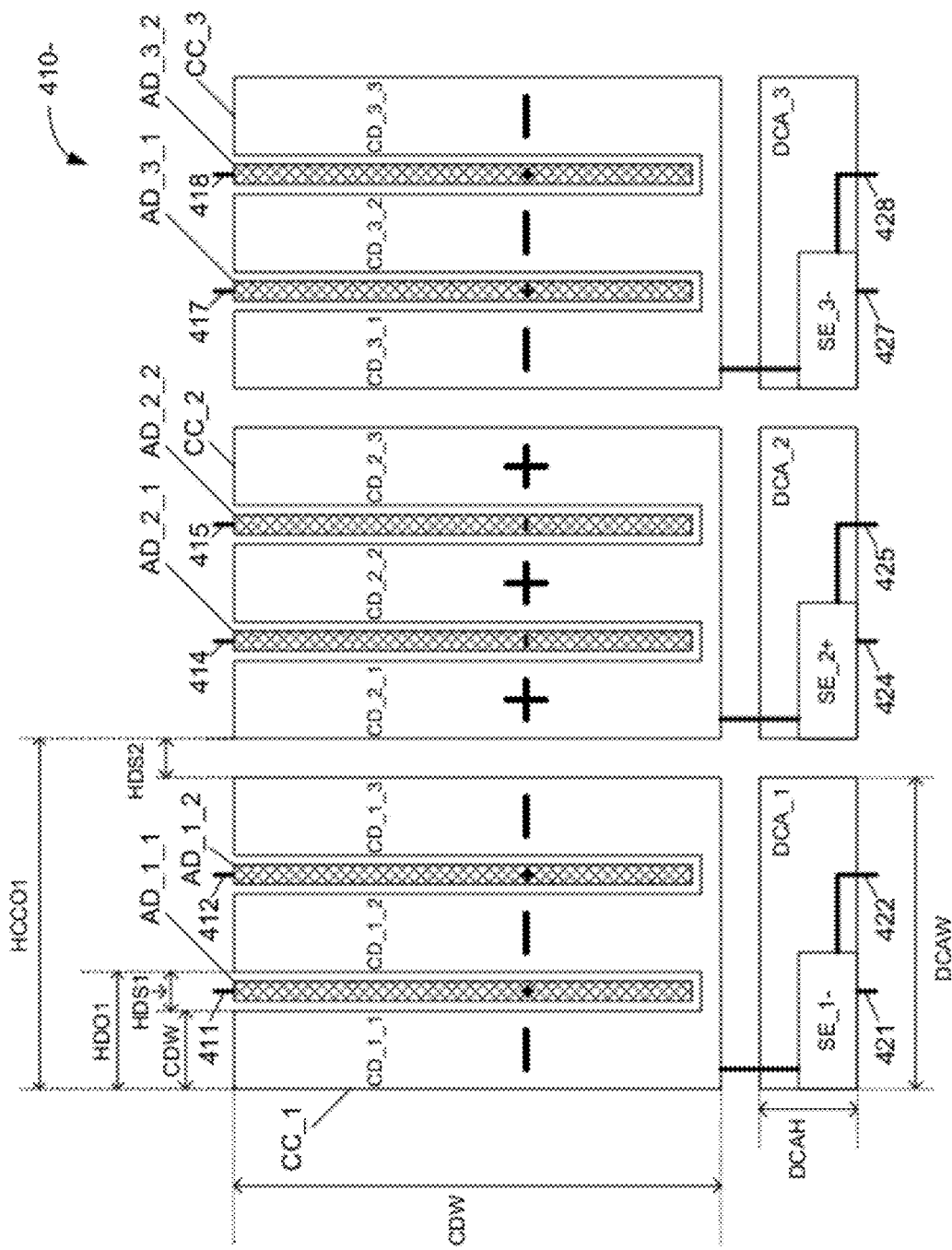

FIGS. 4(a) and 4(b) show different dot polarity patterns of a pixel design 410 (labeled 410+ and 410− as described below) that is often used in displays having a switching element point inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). Furthermore, the polarity of each polarized component in the various pixel designs are indicated with "+" for positive polarity or "−" for negative polarity.

Pixel design 410 has three color components CC_1, CC_2 and CC_3. Each of the three color components includes three color dots. For clarity, the color dots are referenced as CD_X_Y, where X is a color component (from 1 to 3 in FIGS. 4(a)-4(b)) and Y is a color dot number (from 1 to 3 in FIGS. 4(a)-4(b)). Pixel design 410 also includes a switching element (referenced as SE_1, SE_2, and SE_3) for each color component and two polarized associated dots for each color component (referenced as AD_I_J, where I is the color component and J is the associated dot number. Switching elements SE_1, SE_2, and SE_3 are arranged in a row. A device component area is shown around each of switching element SE_1, SE_2, and SE_3 and labeled DCA_1, DCA_2, and DCA_3, respectively.

First color component CC_1 of pixel design 410 has three color dots CD_1_1, CD_1_2, and CD_1_3. Color dots CD_1_1, CD_1_2, and CD_1_3, form a row and are separated by horizontal dot pacing HDS1. In other words, color dots CD_1_1, CD_1_2, and CD_1_3 are vertically aligned and horizontally separated by horizontal dot spacing HDS1. Furthermore, color dots CD_1_1 and CD_1_2 are horizontally offset by horizontal dot offset HDO1 which is equal to horizontal dot spacing HDS1 plus the color dot width CDW. However, color dots CD_1_1 and CD_1_2 are electrically connected at the bottom of color dots CD_1_1 and CD_1_2. Similarly, color dots CD_1_2 and color dots CD_1_3 are electrically connected at the bottom of color dots CD_1_2 and CD_1_3. In pixel design 410, switching element SE_1 is located below color component CC_1. Switching element SE_1 is coupled to the electrodes of color dots CD_1_1, CD_1_2, and CD_1_3 to control the voltage polarity and voltage magnitude of color dots CD_1_1, CD_1_2, and CD_1_3.

Similarly, second color component CC_2 of pixel design 410 has three color dots CD_2_1, CD_2_2, and CD_2_3. Color dots CD_2_1, CD_2_2, and CD_2_3 are also placed in a row and are separated by horizontal dot spacing HDS1. Thus, color dots CD_2_1, CD_2_2, and CD_2_3 are vertically aligned and horizontally, separated by horizontal dot spacing HDS1. However, color dots CD_2_1 and CD_2_2 are electrically connected at the bottom of color dots CD_2_1 and CD_2_2. Similarly, color dots CD_2_2 and color dots CD_2_3 are electrically connected at the bottom of color dots CD_2_2 and CD_2_3. Switching element SE_2 is located below color component CC_2. Switching element SE_2 is coupled to the electrodes of color dots CD_2_1, CD_2_2, and CD_2_3 to control the voltage polarity and voltage magnitude of color dots CD_2_1, CD_2_2, and CD_2_3. Second color component CC_2 is vertically aligned with first color component CC_1 and separated from color component CC_1 by a horizontal dot spacing HDS2, thus color components CC_2 and CC_1 are horizontally offset by a horizontal color component offset HCCO1, which is equal to two times horizontal dot spacing HDS1 plus three times color dot width CDW plus horizontal dot spacing HDS2.

Similarly, third color component CC_3 of pixel design 410 has three color dots CD_3_1, CD_3_2, and CD_3_3. Color dots CD_3_1, CD_3_2, and CD_3_3 are also placed in a row and are separated by horizontal dot spacing HDS1. Thus, color dots CD_3_1, CD_3_2, and CD_3_3 are vertically aligned and horizontally separated by horizontal dot spacing HDS1. However, color dots CD_3_1 and CD_3_2 are electrically connected at the bottom of color dots CD_3_1 and CD_3_2. Similarly, color dots CD_3_2 and color dots CD_3_3 are electrically connected at the bottom of color dots CD_3_2 and CD_3_3. Switching element SE_3 is located below color component CC_3. Switching element SE_3 is coupled to the electrodes of color dots CD_3_1, CD_3_2, and CD_3_3 to control the voltage polarity and voltage magnitude of color dots CD_3_1, CD_3_2, and CD_3_3. Third color component CC_3 is vertically aligned with second color component CC_2 and separated from color component CC_2 by horizontal dot spacing HDS2, thus color components CC_3 and CC_2 are horizontally offset by a horizontal color component offset HCCO1.

For clarity, the color dots of pixel design 410 are illustrated with color dots having the same color dot width CDW. Furthermore, all the color dots in pixel design 410 have the same color dot height CDH. However, some embodiments of the present invention may have color dots with different color dot widths and different color dot heights.

Pixel design 410 also includes associated dots AD_1_1, AD_1_2, AD_2_1, AD_2_2, AD_3_1, and AD_3_2. In pixel design 410, the associated dots are rectangular with an associated dot width ADW (not labeled in FIG. 4(a)) and an associated dot height ADH (not labeled in FIG. 4(a)).

As shown in FIG. 4(a), the associated dots are placed in between the color dots of pixel design 410. Specifically, associated dot AD_1_1 is placed in between color dots CD_1_1 and CD_1_2 and associated dot AD_1_2 is placed between color dots CD_1_2 and CD_1_3. Similarly, associated dot AD_2_1 is placed in between color dots CD_2_1 and CD_2_2, associated dot AD_2_2 is placed between color dots CD_1_2 and CD_1_3, associated dot AD_3_1 is placed in between color dots CD_3_1 and CD_3_2, associated dot AD_3_2 is placed between color dots CD_3_2 and CD_3_3. The associated dots are horizontally separated from the color spots by a horizontal associated dot spacing HADS (not labeled in FIG. 4(a)) and are vertically separated from portions of the color dots by a vertical associated dot spacing VADS (not labeled in FIG. 4(a).

Pixel design 410 is designed so that the associated dots can receive polarity from an adjacent pixel. Specifically, a first conductor is coupled to a associate dot to receive polarity from the pixel above the current pixel and a second conductor is coupled to the switching element to provide polarity to an associated dot of a pixel below the current pixel. For example, conductor 411, which is coupled to the electrode of associate dot AD_1_1, extends upward to connect to the equivalent conductor of conductor 421 of a pixel above the current pixel to receive polarity. (see FIG. 4(c)). Conductor 421, which is coupled to switching element SE_1 extends downward to connect to the equivalent conductor of conductor 411 in the pixel below the current pixel. Conductors 412 and 422 serve the same purpose for associated dot AD_1_2. Similarly, Conductors 414 and 424 serve the same purpose for associated dot AD_2_1. Conductors 414 and 424 serve the same purpose for associated dot AD_2_1. Conductors 415 and 425 serve the same purpose for associated dot AD_2_2. Conductors 417 and 427 serve the same purpose for associated dot AD_3_1. Conductors 418 and 428 serve the same purpose for associated dot AD_3_2.

The polarities of the color dots, associated dots, and switching elements are shown using "+" and "−" signs. Thus, in FIG. 4(a), which shows the positive dot polarity pattern of pixel design 410+, switching elements SE_1 and SE_3; color dots CD_1_1, CD_1_2, CD_1_3, CD_3_1, CD_3_2, and CD_3_3; and associated dots AD_2_1 and AD_2_2 have positive polarity. However, switching element SE_2; color dots CD_2_1, CD_2_2, and CD_2_3; and associated dots AD_1_1, AD_1_2, AD_3_1, and AD_3_2 have negative polarity.

FIG. 4(b) shows pixel design 410 with the negative dot polarity pattern. For the negative dot polarity pattern, switching elements SE_1 and SE_3; color dots CD_1_1, CD_1_2, CD_1_3, CD_3_1, CD_3_2, and CD_3_3; and associated dots AD_2_1 and AD_2_2 have negative polarity. However, switching element SE_2; color dots CD_2_1, CD_2_2, and CD_2_3; and associated dots AD_1_1, AD_1_2, AD_3_1, and AD_3_2 have positive polarity.

As explained above fringe fields in each of the color dots are amplified if adjacent components have opposite polarities. Pixel design 410 makes use of the fringe field amplifying regions to enhance and stabilize the formation of multiple domain in the liquid crystal structure. In general, the polarities of the polarized components are assigned so that a color dot of a first polarity has neighboring polarized components of the second polarity. For example for the positive dot polarity pattern of pixel design 410 (FIG. 4(a)), color dot CD_1_3 has positive polarity. However the neighboring polarized components (associated dot AD_1_2 and color dot CD_2_1) have negative polarity. Thus, the fringe field of color dot CD_1_3 amplified. Furthermore, as explained below, the polarity reversing scheme is carried out at the display level as well so that the color dot of another pixel that is placed next to color dot CD_3_3 would have negative polarity because color dot CD_3_3 has positive polarity. (see FIG. 4(d)).

Pixels using pixel design 410 of FIGS. 4(a) and 4(b) can be used in displays using switching element point inversion driving schemes. FIG. 4(c) shows a portion of display 450 using pixels P(0, 0), P(1, 0), P(0, 1), and P(1, 1) of pixel design 410 with a switching element point inversion driving scheme. Display 450 could have thousands of rows with thousand of pixels on each row. The rows and columns would continue from the portion shown in FIG. 4(c) in the manner shown in FIG. 4(c). For clarity, the gate lines and source lines that control the switching elements are omitted in FIG. 4(c). To better illustrate each pixel, the area of each pixel is shaded; this shading is only for illustrative purposes in FIG. 4(c) and has no functional significance. In display 450 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the associated dots of a first pixel receive polarity from the switching elements of a second pixel. For example, the electrode of associated dot AD_1_2 of pixel P(0, 0) is coupled to switching elements SE_1 of pixel P(0, 1) via conductor 412 of pixel P(0, 0) and conductor 411 of pixel P(0, 1). Similarly, the electrode of associated dot AD_3_1 of pixel P(0, 0) is coupled to switching elements SE_3 of pixel P(0, 1) via conductor 417 of pixel P(0, 0) and conductor 427 of pixel P(0, 1). Furthermore, as explained above, the polarity of polarized components adjacent to a color dot having a first polarity would have a second polarity. For example color dot CD_3_3 of pixel P(0, 0) has positive polarity and color dot CD_1_1 of pixel P(1, 0) has negative polarity.

In a particular embodiment of the present invention, each color dot has a width of 140 micrometers and a height of 420 micrometers. Each associated dot has an associated dot width of 5 micrometers and an associated dot height of 370 micrometers, Horizontal dot spacing HDS1 is 19 micrometers, vertical dot spacing VDS3 is 30 micrometers, horizontal associated dot spacing HADS1 is 15 micrometers.

Figure 5A:
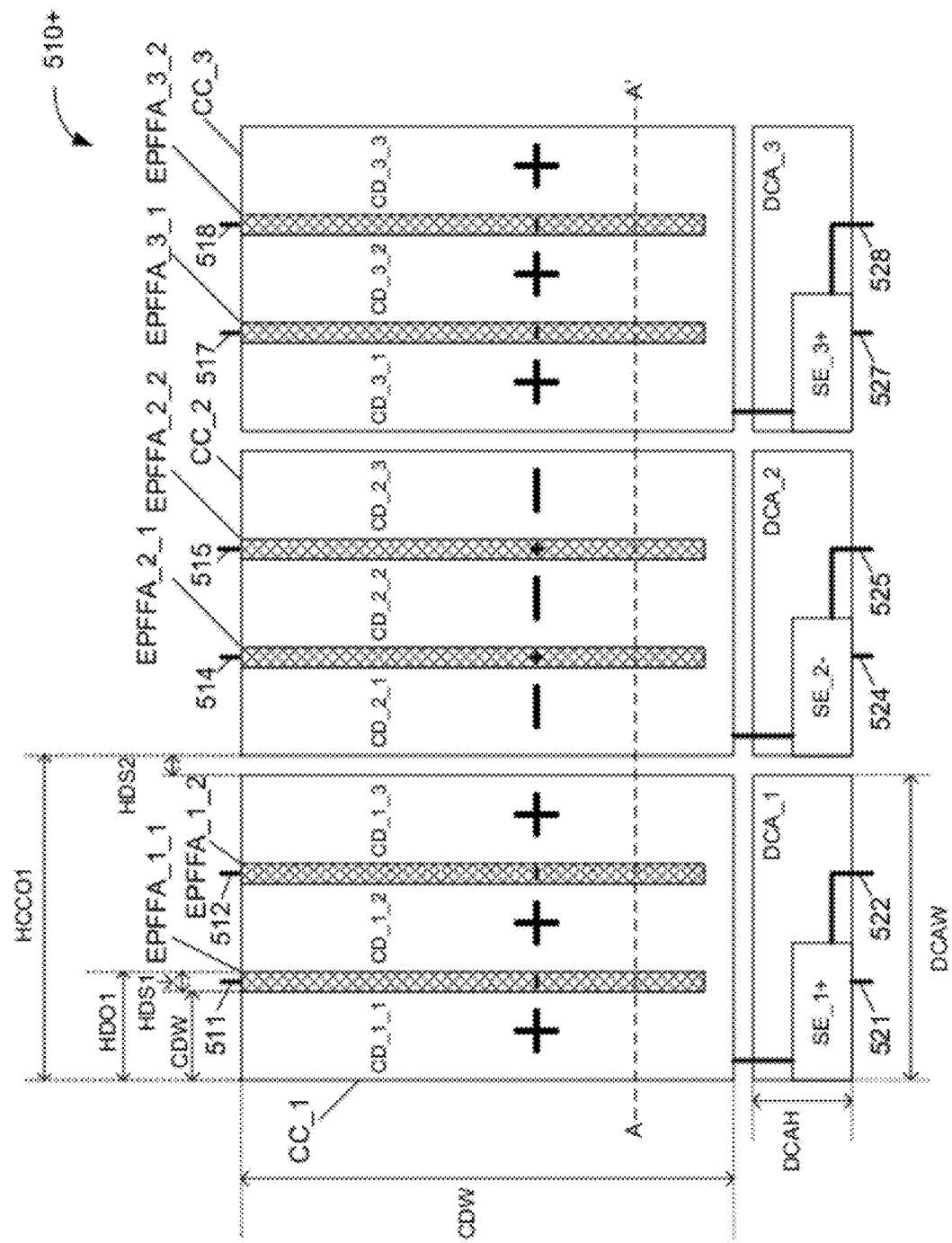
FIGS. 5(a)-5(d) illustrate a pixel design in accordance with one embodiment of the present invention.
Figure 5B:
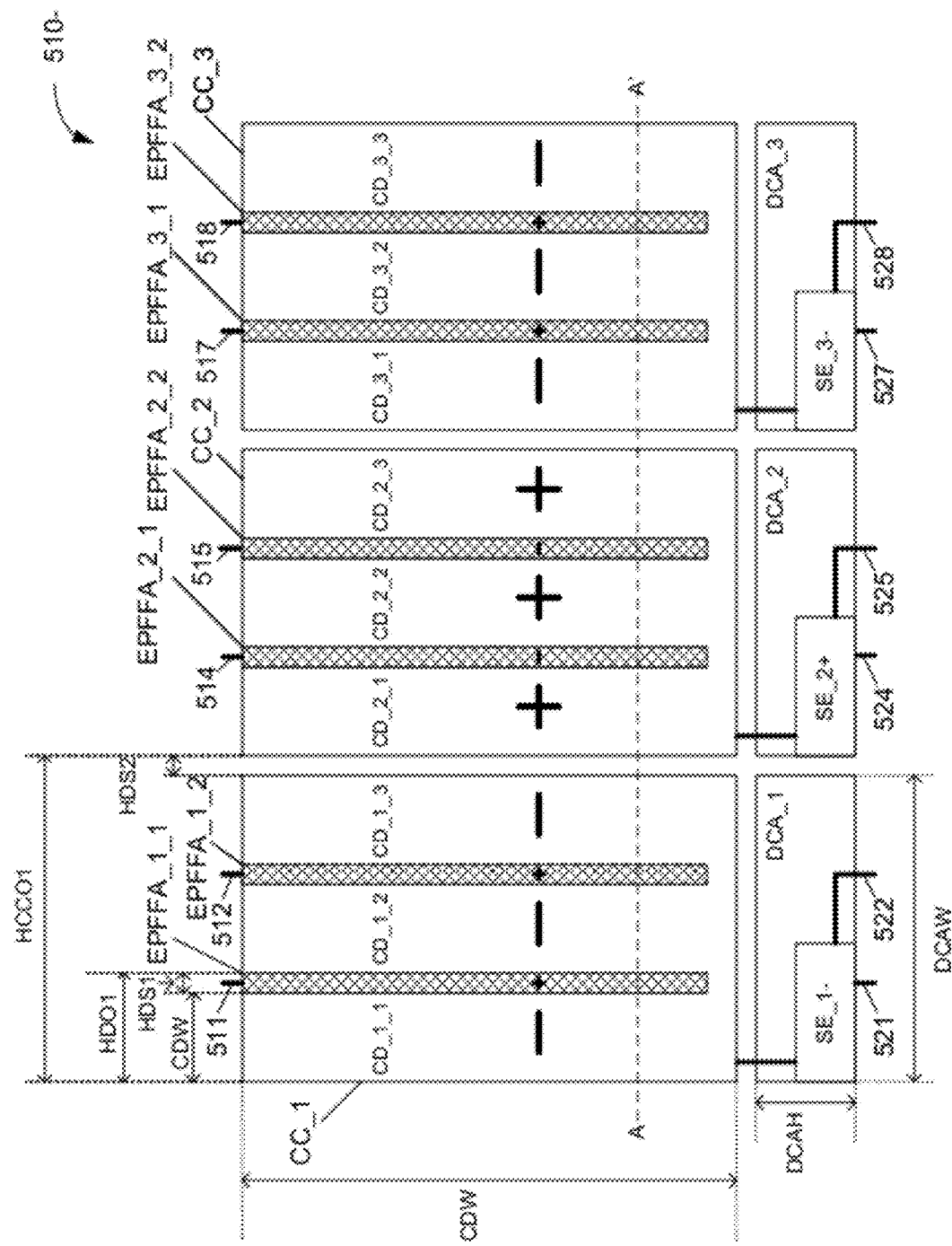

FIGS. 5(a) and 5(b) show different dot polarity patterns of a pixel design 510 that is often used in displays having a switching element point inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 5(a), pixel design 510 has a positive dot polarity pattern (and is thus labeled 510+) and in FIG. 5(b), pixel design 510 has a negative dot polarity pattern (and is thus labeled 510-). Furthermore, the polarity of each polarized component in the various pixel designs are indicated with "+" for positive polarity or "-" for negative polarity.

Pixel design 510 has three color components CC_1, CC_2 and CC_3. Each of the three color components includes three color dots. For clarity, the color dots are referenced as CD_X_Y, where X is a color component (from 1 to 3 in FIGS. 5(a)-5(b)) and Y is a color dot number (from 1 to 3 in FIGS. 5(a)-5(b)). Pixel design 510 also includes a switching element (referenced as SE_1, SE_2, and SE_3) for each color component and two polarized extra-planar fringe field amplifier for each color component (referenced as EPFFA_I_J, where I is the color component and J is the extra-planer fringe field amplifier number). Switching elements SE_1, SE_2, and SE_3 are arranged in a row. A device component area is shown around each of switching element SE_1, SE_2, and SE_3 and labeled DCA_1, DCA_2, and DCA_3, respectively.

First color component CC_1 of pixel design 510 has three color dots CD_1_1, CD_1_2, and CD_1_3. Color dots CD_1_1, CD_1_2, and CD_1_3, form a row and are separated by horizontal dot pacing HDS1. In other words, color dots CD_1_1, CD_1_2, and CD_1_3 are vertically aligned and horizontally separated by horizontal dot spacing HDS1. Furthermore, color dots CD_1_1 and CD_1_2 are horizontally offset by horizontal dot offset HDO1 which is equal to horizontal dot spacing HDS1 plus the color dot width CDW. However, color dots CD_1_1 and CD_1_2 are electrically connected at the bottom of color dots CD_1_1 and CD_1_2. Similarly, color dots CD_1_2 and color dots CD_1_3 are electrically connected at the bottom of color dots CD_1_2 and CD_1_3. In pixel design 510, switching element SE_1 is located below color component CC_1. Switching element SE_1 is coupled to the electrodes of color dots CD_1_1, CD_1_2, and CD_1_3 to control the voltage polarity and voltage magnitude of color dots CD_1_1, CD_1_2, and CD_1_3.

Similarly, second color component CC_2 of pixel design 510 has three color dots CD_2_1, CD_2_2, and CD_2_3. Color dots CD_2_1, CD_2_2, and CD_2_3 are also placed in a row and are separated by horizontal dot spacing HDS1. Thus, color dots CD_2_1, CD_2_2, and CD_2_3 are vertically aligned and horizontally, separated by horizontal dot spacing HDS1. However, color dots CD_2_1 and CD_2_2 are electrically connected at the bottom of color dots CD_2_1 and CD_2_2. Similarly, color dots CD_2_2 and color dots CD_2_3 are electrically connected at the bottom of color dots CD_2_2 and CD_2_3. Switching element SE_2 is located below color component CC_2. Switching element SE_2 is coupled to the electrodes of color dots CD_2_1, CD_2_2, and CD_2_3 to control the voltage polarity and voltage magnitude of color dots CD_2_1, CD_2_2, and CD_2_3. Second color component CC_2 is vertically aligned with first color component CC_1 and separated from color component CC_1 by a horizontal dot spacing HDS2, thus color components CC_2 and CC_1 are horizontally offset by a horizontal color component offset HCCO1, which is equal to two times horizontal dot spacing HDS1 plus three times color dot width CDW plus horizontal dot spacing HDS2.

Similarly, third color component CC_3 of pixel design 510 has three color dots CD_3_1, CD_3_2, and CD_3_3. Color dots CD_3_1, CD_3_2, and CD_3_3 are also placed in a row and are separated by horizontal dot spacing HDS1. Thus, color dots CD_3_1, CD_3_2, and CD_3_3 are vertically aligned and horizontally separated by horizontal dot spacing HDS1. However, color dots CD_3_1 and CD_3_2 are electrically connected at the bottom of color dots CD_3_1 and CD_3_2. Similarly, color dots CD_3_2 and color dots CD_3_3 are electrically connected at the bottom of color dots CD_3_2 and CD_3_3. Switching element SE_3 is located below color component CC_3. Switching element SE_3 is coupled to the electrodes of color dots CD_3_1, CD_3_2, and CD_3_3 to control the voltage polarity and voltage magnitude of color dots CD_3_1, CD_3_2, and CD_3_3. Third color component CC_3 is vertically aligned with second color component CC_2 and separated from color component CC_2 by horizontal dot spacing HDS2, thus color components CC_3 and CC_2 are horizontally offset by a horizontal color component offset HCCO1.

For clarity, the color dots of pixel design 510 are illustrated with color dots having the same color dot width CDW. Furthermore, all the color dots in pixel design 510 have the same color dot height CDH. However, some embodiments of the present invention may have color dots with different color dot widths and different color dot heights.

Pixel design 510 also includes extra-planar fringe field amplifiers EPFFA_1_1, EPFFA_1_2, EPFFA_2_1, EPFFA_2_2, EPFFA_3_1, and EPFFA_3_2. In pixel design 510, the extra-planar fringe field amplifiers are rectangular with an extra-planar fringe field amplifier width EPFFAW (not labeled in FIG. 5(a)) and an extra-planar fringe field amplifier height EPFFAH (not labeled in FIG. 5(a)).

As shown in FIG. 5(a), the extra-planar fringe field amplifiers are placed in between the color dots of pixel design 510. Specifically, extra-planar fringe field amplifier EPFFA_1_1 is placed in between color dots CD_1_1 and CD_1_2 and extra-planar fringe field amplifier EPFFA_1_2 is placed between color dots CD_1_2 and CD_1_3. Similarly, extra-planar fringe field amplifier EPFFA_2_1 is placed in between color dots CD_2_1 and CD_2_2, extra-planar fringe field amplifier EPFFA_2_2 is placed between color dots CD_1_2 and CD_1_3, extra-planar fringe field amplifier EPFFA_3_1 is placed in between color dots CD_3_1 and CD_3_2, extra-planar fringe field amplifier EPFFA_3_2 is placed between color dots CD_3_2 and CD_3_3. Although it appears from FIGS. 5(a) and 5(b) that the color dots are touching the extra-planar fringe field amplifiers, the extra-planar fringe field amplifiers actually lie in a different plane as illustrated in FIG. 5(c), which shows a cross section of pixel design 510 taken at the A-A' cut.

Figure 5C:
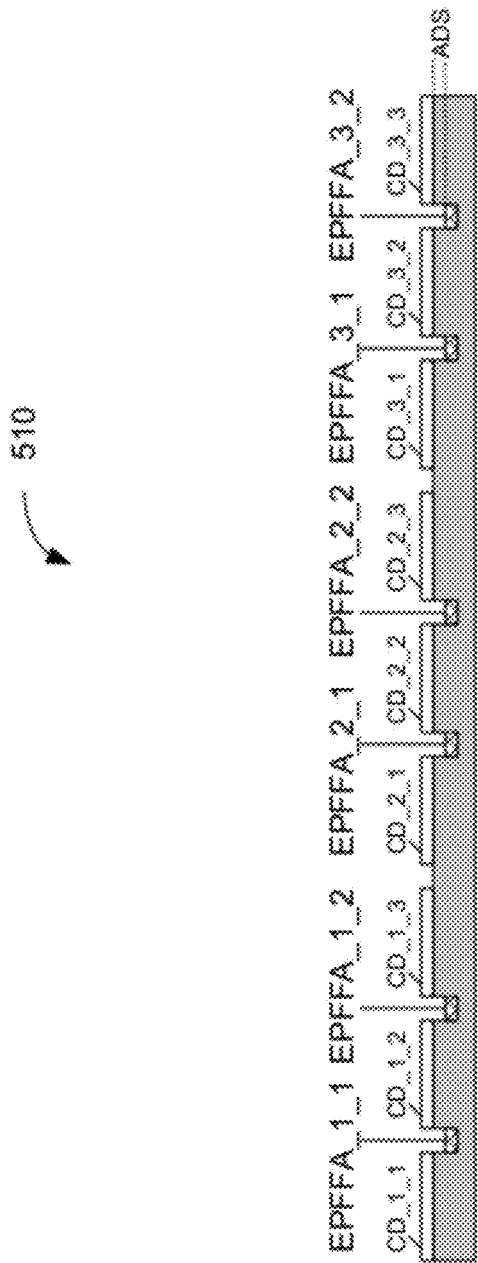

FIG. 5(c) shows cross section of color dots CD_1_1, CD_1_2, CD_1_3, CD_2_1, CD_2_2, CD_2_3, CD_3_1, CD_3_2, and CD_3_3, and extra-planar fringe field amplifiers EPFFA_1_1, EPFFA_1_2, EPFFA_2_1, EPFFA_2_2, EPFFA_3_1, and EPFFA_3_2. The color dots are in a first plane and the extra-planar fringe field amplifiers are in a second plane. Specifically, the extra-planar fringe field amplifiers of pixel design 510 are below the color dots. More specifically, the top of the extra planar fringe field amplifiers are separated from bottom of the color dots by an amplifier depth spacing ADS. In other embodiments of the present invention the extra-planar fringe field amplifiers can be above the color dots. In these embodiments amplifier depth spacing ADS is measured from the top of the color dots to the bottom of the extra-planar fringe field amplifiers.

Thus, extra-planar fringe field amplifier EPFFA_1_2 can be described as horizontally adjacent to color dot CD_1_1 and horizontally adjacent to color dot CD_1_2 but on a different plane relative to color dots CD_1_1 and CD_1_2. Extra-planar fringe field amplifier EPFFA_1_2 can also be described as horizontally in between color dots CD_1_1 and CD_1_2 but on a lower plane relative to color dots CD_1_1 and CD_1_2. Similarly, extra-planar fringe field amplifiers EPFFA_1_2, EPFFA_2_1, EPFFA_2_2, EPFFA_3_1, and EPFFA_3_2 are horizontally in between color dots CD_1_2 and CD_1_3, color dots CD_2_1 and CD_2_2, color dots CD_2_2 and CD_2_3, color dots CD_3_1 and CD_3_2, and color dots CD_3_2 and CD_3_3, respectively, and on a different plane than the color dots.

By using extra-planar fringe field amplifiers, the color dots can be placed closer together as compared to using polarized elements in the plane of the color dots. Reducing the spacing of the color dots increases the brightness and contrast of the display.

For example, in pixel design 510, horizontal dot spacing HDS1 (i.e. the space between color dots within a color component) is equal to the width of the extra-planar fringe field amplifier (EPFFA_W). Other embodiments of the present invention can even have the color dots partially overlap the extra-planar fringe field amplifiers to further reduce dot spacing. Extra-planar fringe field amplifiers can be formed using any conductor. However, to minimize costs and process steps, generally, extra-planar fringe field amplifiers are formed using a metal layer that is used for the formation of the switching elements.

Pixel design 510 is designed so that the extra-planar fringe field amplifiers can receive polarity from an adjacent pixel. Specifically, a first conductor is coupled to an extra-planar fringe field amplifier to receive polarity from the pixel above the current pixel and a second conductor is coupled to the switching element to provide polarity to an extra-planar fringe field amplifier of a pixel below the current pixel. For example, conductor 511, which is coupled to the electrode of associate dot EPFFA_1_1, extends upward to connect to the equivalent conductor of conductor 521 of a pixel above the current pixel to receive polarity. (see FIG. 5(d)). Conductor 521, which is coupled to switching element SE_1 extends downward to connect to the equivalent conductor of conductor 511 in the pixel below the current pixel. Conductors 512 and 522 serve the same purpose for extra-planar fringe field amplifier EPFFA_1_2. Similarly, Conductors 514 and 524 serve the same purpose for extra-planar fringe field amplifier EPFFA_2_1. Conductors 514 and 524 serve the same purpose for extra-planar fringe field amplifier EPFFA_2_1. Conductors 515 and 525 serve the same purpose for extra-planar fringe field amplifier EPFFA_2_2. Conductors 517 and 527 serve the same purpose for extra-planar fringe field amplifier EPFFA_3_1. Conductors 518 and 528 serve the same purpose for extra-planar fringe field amplifier EPFFA_3_2.

The polarities of the color dots, extra-planar fringe field amplifiers, and switching elements are shown using "+" and "−" signs. Thus, in FIG. 5(a), which shows the positive dot polarity pattern of pixel design 510+, switching elements SE_1 and SE_3; color dots CD_1_1, CD_1_2, CD_1_3, CD_3_1, CD_3_2, and CD_3_3; and extra-planar fringe field amplifiers EPFFA_2_1 and EPFFA_2_2 have positive polarity. However, switching element SE_2; color dots CD_2_1, CD_2_2, and CD_2_3; and extra-planar fringe field amplifiers EPFFA_1_1, EPFFA_1_2, EPFFA_3_1, and EPFFA_3_2 have negative polarity.

FIG. 5(b) shows pixel design 510 with the negative dot polarity pattern. For the negative dot polarity pattern, switching elements SE_1 and SE_3; color dots CD_1_1, CD_1_2, CD_1_3, CD_3_1, CD_3_2, and CD_3_3; and extra-planar fringe field amplifiers EPFFA_2_1 and EPFFA_2_2 have negative polarity. However, switching element SE_2; color dots CD_2_1, CD_2_2, and CD_2_3; and extra-planar fringe field amplifiers EPFFA_1_1, EPFFA_1_2, EPFFA_3_1, and EPFFA_3_2 have positive polarity.

As explained above fringe fields in each of the color dots are amplified if adjacent components have opposite polarities. Pixel design 510 makes use of the extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 510 (FIG. 5(a)), color dot CD_1_3 has positive polarity. However the neighboring polarized components (extra-planar fringe field amplifier EPFFA_1_2 and color dot CD_2_1) have negative polarity. Thus, the fringe field of color dot CD_1_3 is amplified. Furthermore, as explained below, the polarity reversing scheme is carried out at the display level as well so that the color dot of another pixel that is placed next to color dot CD_3_3 would have negative polarity because color dot CD_3_3 has positive polarity. (see FIG. 5(d)).

Figure 5D:
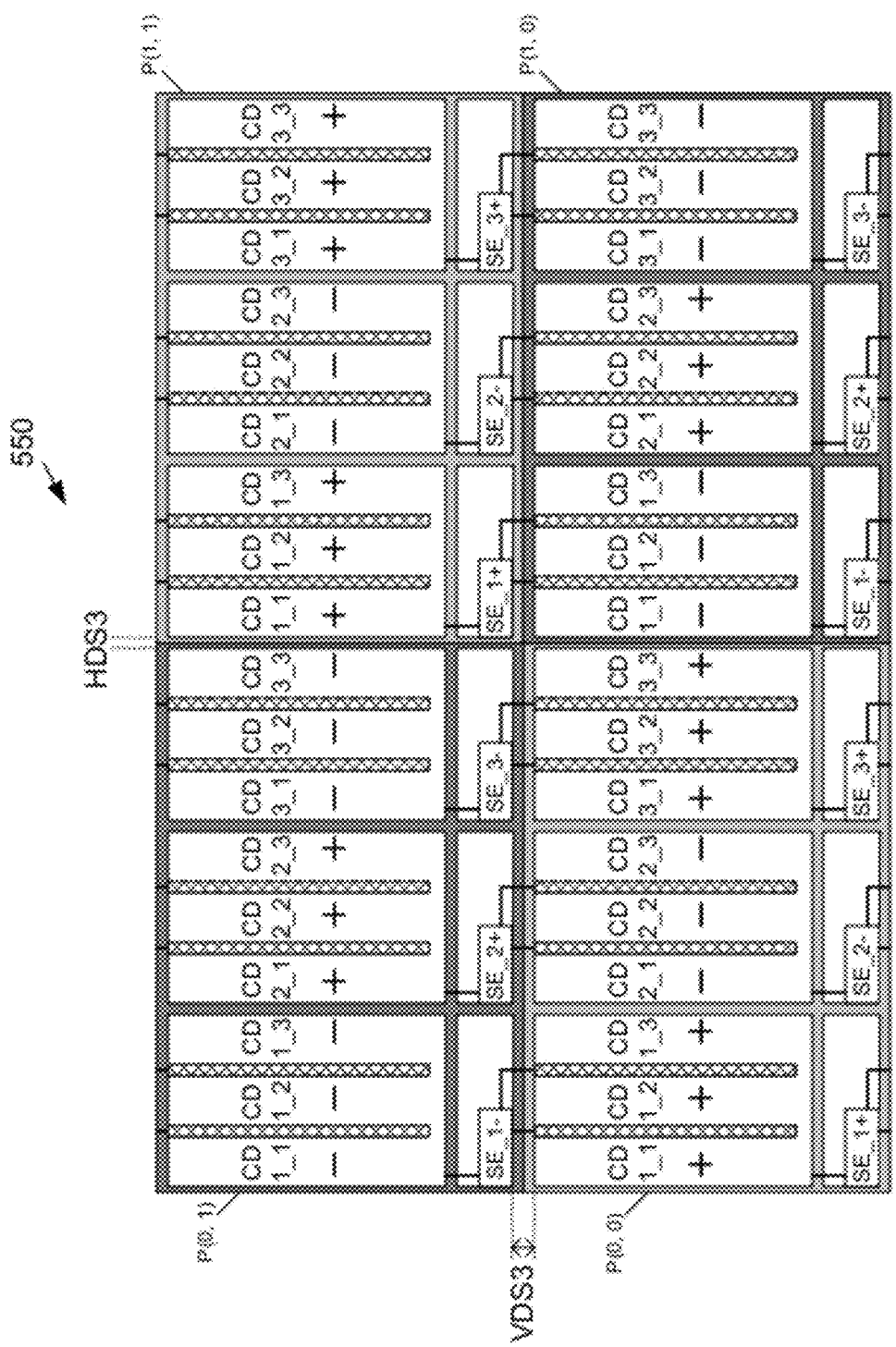

Pixels using pixel design 510 of FIGS. 5(a) and 5(b) can be used in displays using switching element point inversion driving schemes. FIG. 5(d) shows a portion of display 550 using pixels P(0, 0), P(1, 0), P(0, 1), and P(1, 1) of pixel design 510 with a switching element point inversion driving scheme. Display 550 could have thousands of rows with thousand of pixels on each row. The rows and columns would continue from the portion shown in FIG. 5(d) in the manner shown in FIG. 5(d). For clarity, the gate lines and source lines that control the switching elements are omitted in FIG. 5(d). To better illustrate each pixel, the area of each pixel is shaded; this shading is only for illustrative purposes in FIG. 5(d) and has no functional significance. In display 550 the pixels are arranged so that pixels in a row alternate dot polarity patterns (positive or negative) and pixels in a column also alternate between positive and negative dot polarity pattern. Thus, pixels P(0, 0) and P(1, 1) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers of a first pixel receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 512 of pixel P(0, 0) and conductor 511 of pixel P(0, 1). Similarly, the electrode of extra-planar fringe field amplifier EPFFA_3_1 of pixel P(0, 0) is coupled to switching elements SE_3 of pixel P(0, 1) via conductor 517 of pixel P(0, 0) and conductor 527 of pixel P(0, 1). Furthermore, as explained above, the polarity of polarized components adjacent to a color dot having a first polarity would have a second polarity. For example color dot CD_3_3 of pixel P(0, 0) has positive polarity and color dot CD_1_1 of pixel P(1, 0) has negative polarity.

Figure 6A:
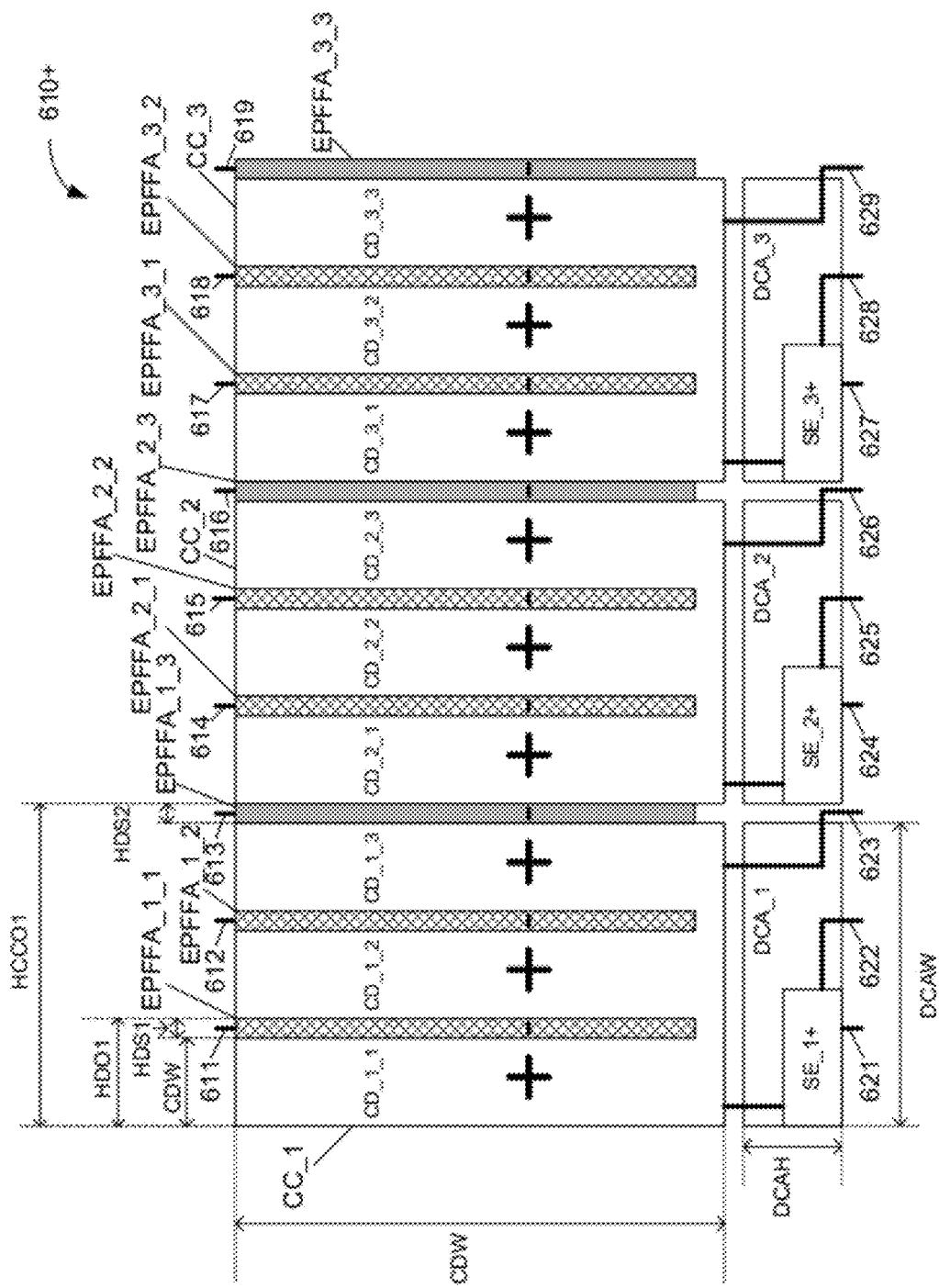
FIGS. 6(a)-6(c) illustrate a pixel design in accordance with one embodiment of the present invention.
Figure 6B:
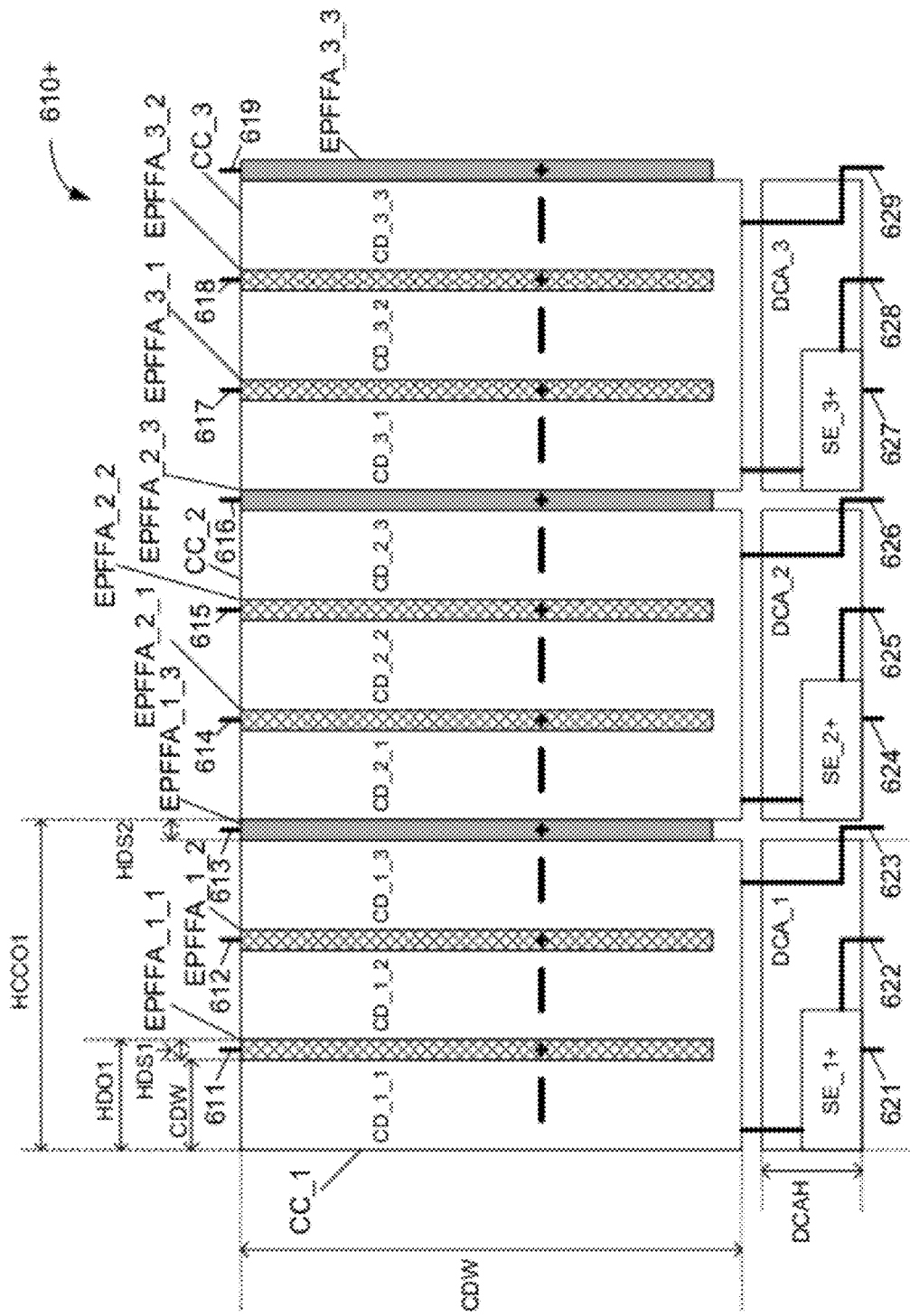

In a particular embodiment of the present invention, each color dot has a width of 140 micrometers and a height of 420 micrometers. Each extra-planar fringe field amplifier has an extra-planar fringe field amplifier width of 4 micrometers and an extra-planar fringe field amplifier height of 375 micrometers, Horizontal dot spacing HDS1 is 4 micrometers, vertical dot spacing VDS1 is 4 micrometers, vertical dot spacing VDS2 is 4 micrometers, vertical dot spacing VDS3 is 30 micrometers, Horizontal dot spacing HDS1 is 4 micrometers, and amplifier depth spacing of 0.4 micrometers FIGS. 6(a) and 6(b) show the positive and negative dot polarity patterns of a pixel design 610 which can be used with switching element row inversion driving schemes. The layout of pixel design 610 is very similar to pixel design 510 (FIGS. 5(a) and 5(b)). Thus for brevity only the differences are described. Specifically, all the color components, extra-planar fringe field amplifiers, switching elements, conductors, and device component areas, from pixel design 510 are placed in the same manner in pixel design 610. For clarity, the reference numerals for the components of pixel design 510 are repeated in pixel design 610. Pixel design 610 adds three additional extra-planar fringe field amplifiers and six conductors to provide polarity to the extra-planar fringe field amplifiers. Furthermore, the polarity of some components in pixel design 610 are modified from pixel design 510 (as explained below).

Specifically, pixel design 610 includes extra-planar fringe field amplifier EPFFA_1_3 horizontally in between color dot CD_1_3 and color dot CD_2_1; extra-planar fringe field amplifier EPFFA_2_3 horizontally in between color dot CD_2_3 and color dot CD_3_1; and extra-planar fringe field amplifier EPFFA_3_3 horizontally adjacent to the right side of color dot CD_3_3. Extra-planar fringe field amplifiers EPFFA_1_3, EPFFA_2_3, and EPFFA_3_3 are in the same plane as extra-planar fringe field amplifiers EPFFA_1_1, EPFFA_1_2, EPFAA_2_1, EPFAA_2_2, EPFAA_3_1, and EPFAA_3_2.

Like pixel design 510, pixel design 610 is designed so that the extra-planar fringe field amplifiers can receive polarity from an adjacent pixel. Specifically, a first conductor is coupled to an extra-planar fringe field amplifier to receive polarity from the pixel above the current pixel and a second conductor is coupled to the switching element to provide polarity to an extra-planar fringe field amplifier of a pixel below the current pixel. Pixel design 610 includes electrodes 613, 616, 619, 623, 626 and 626 in addition to the electrodes that are included in pixel design 510. Specifically, conductor 513, which is coupled to the electrode of associate dot EPFFA_1_3, extends upward to connect to the equivalent conductor of conductor 623 of a pixel above the current pixel to receive polarity (see FIG. 6(d)). Conductor 623, which is coupled to switching element SE_1 extends downward to connect to the equivalent conductor of conductor 613 in the pixel below the current pixel. Conductors 616 and 526 serve the same purpose for extra-planar fringe field amplifier EPFFA_2_3. Similarly, Conductors 619 and 629 serve the same purpose for extra-planar fringe field amplifier EPFFA_3_3.

The polarities of the color dots, extra-planar fringe field amplifiers, and switching elements are shown using "+" and "−" signs. Thus, in FIG. 6(a), which shows the positive dot polarity pattern of pixel design 610+, all switching elements (i.e. switching elements SE_1, SE_2, and SE_3) and color dots (i.e. color dots CD_1_1, CD_1_2, CD_1_3, CD_2_1, CD_2_2, CD_2_3, CD_3_1, CD_3_2, and CD_3_3) have positive polarity. All extra-planar fringe field amplifiers (i.e. extra-planar fringe field amplifiers EPFFA_1_1, EPFFA_1_2, EPFFA_1_3, EPFFA_2_1, EPFFA_2_2, EPFAA_2_3, EPFFA_3_1, EPFFA_3_2, and EPFFA_3_3 have negative polarity.

FIG. 6(b) shows pixel design 610 with the negative dot polarity pattern. For the negative dot polarity pattern, all switching elements (i.e. switching elements SE_1, SE_2, and SE_3) and color dots (i.e. color dots CD_1_1, CD_1_2, CD_1_3, CD_2_1, CD_2_2, CD_2_3, CD_3_1, CD_3_2, and CD_3_3) have negative polarity. All extra-planar fringe field amplifiers (i.e. extra-planar fringe field amplifiers EPFFA_1_1, EPFFA_1_2, EPFFA_1_3, EPFFA_2_1, EPFFA_2_2, EPFAA_2_3, EPFFA_3_1, EPFFA_3_2, and EPFFA_3_3 have positive polarity.

As explained above fringe fields in each of the color dots are amplified if adjacent components have opposite polarities. Pixel design 610 makes use of the fringe field amplifying regions to enhance and stabilize the formation of multiple domain in the liquid crystal structure. In general, the polarities of the polarized components are assigned so that a color dot of a first polarity has neighboring polarized components of the second polarity. For example for the positive dot polarity pattern of pixel design 610 (FIG. 6(a)), color dot CD_2_3 has positive polarity. However the neighboring polarized components (i.e. extra-planar fringe field amplifier EPFFA_2_1 and EPFFA_1_3) have negative polarity. Thus, the fringe field of color dot CD_2_3 is amplified. Furthermore, as explained below, the polarity reversing scheme is carried out at the display level as well so that polarized elements of another pixel that is placed next to color dot CD_1_1 would have negative polarity because color dot CD_3_3 has negative polarity (see FIG. 5(c)).

Figure 6C:
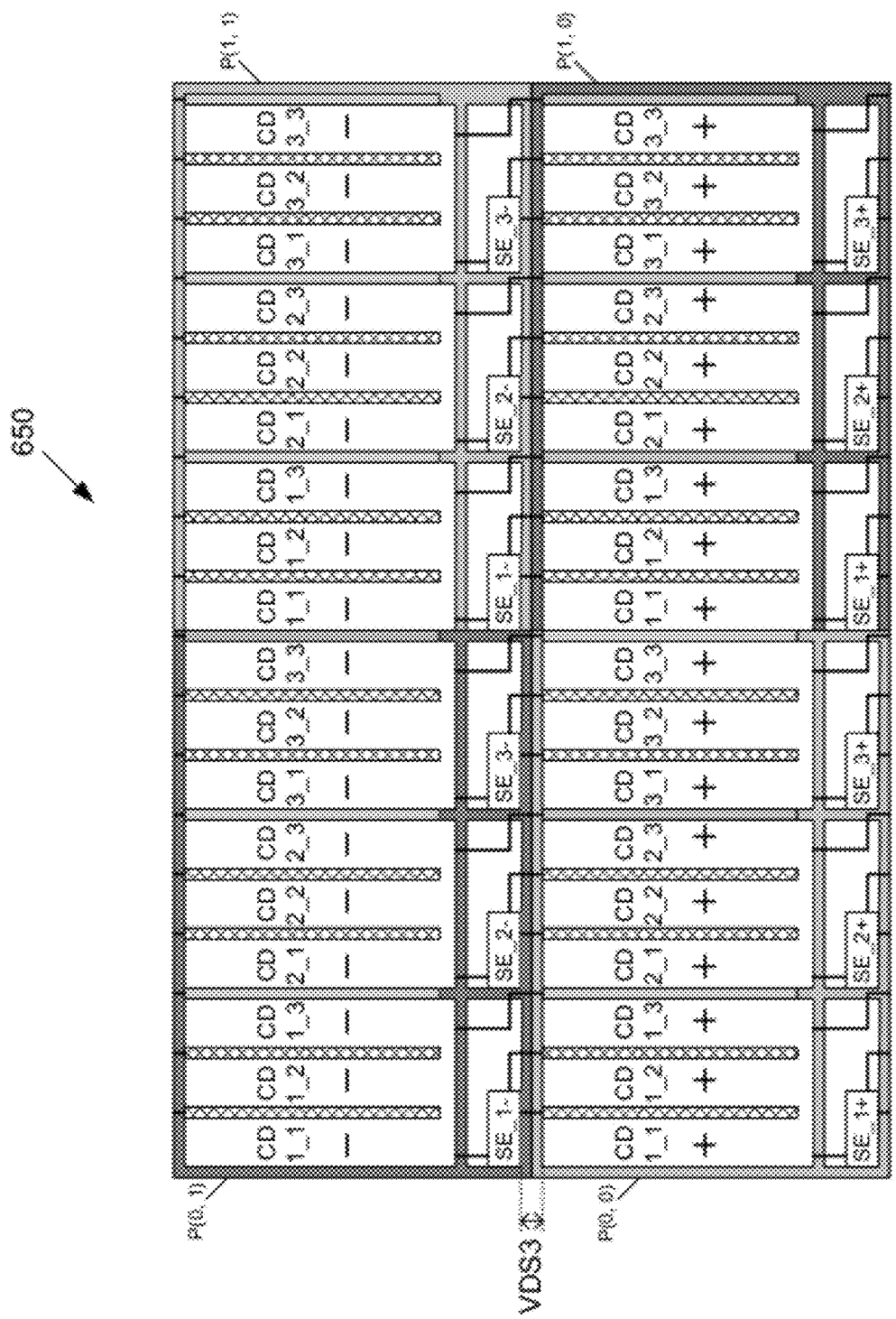

Pixels using pixel design 610 of FIGS. 6(a) and 6(b) can be used in displays using switching element row inversion driving schemes, which is generally less expensive than switching element point inversion driving schemes. FIG. 6(c) shows a portion of display 650 using pixels P(0, 0), P(1, 0), P(0, 1), and P(1, 1) of pixel design 610 with a switching element row inversion driving scheme. Display 650 could have thousands of rows with thousand of pixels on each row. The rows and columns would continue from the portion shown in FIG. 6(c) in the manner shown in FIG. 6(c). For clarity, the gate lines and source lines that control the switching elements are omitted in FIG. 6(c). To better illustrate each pixel, the area of each pixel is shaded; this shading is only for illustrative purposes in FIG. 6(c) and has no functional significance. In display 650 the pixels are arranged so that pixels in a row have the same dot polarity patterns (positive or negative) and pixels in a column alternate between positive and negative dot polarity pattern. Thus, pixels P(0, 0) and P(1, 0) have positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when y is even and a second dot polarity pattern when y is odd. Pixels on each row of pixels are vertically aligned and arranged so that extra-planar fringe field amplifier EPFFA_3_3 of a first pixel is horizontally adjacent to color dot CD_1_3 of a second pixel to the right of the first pixel. For example, extra-planar fringe field amplifier EPFFA_3_3 of pixel P(0, 0) is horizontally adjacent to color dot CD_1_3 of pixel P(1, 0). Pixels on a column of pixels are horizontally aligned and separated by a vertical dot spacing VDS3.

As stated above, the extra-planar fringe field amplifiers of a first pixel receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 612 of pixel P(0, 0) and conductor 611 of pixel P(0, 1). Similarly, the electrode of extra-planar fringe field amplifier EPFFA_3_1 of pixel P(0, 0) is coupled to switching elements SE_3 of pixel P(0, 1) via conductor 617 of pixel P(0, 0) and conductor 627 of pixel P(0, 1). Furthermore, as explained above, the polarity of polarized components adjacent to a color dot having a first polarity would have a second polarity. For example color dot CD_1_1 of pixel P(1, 0) has positive polarity and extra-planar fringe field amplifier EPFFA_3_1 of pixel P(0, 0) has negative polarity, which was provided by switching element SE_3 of pixel P(0, 1).

In a particular embodiment of the present invention, each color dot has a width of 140 micrometers and a height of 420 micrometers. Each extra-planar fringe field amplifier has an extra-planar fringe field amplifier width of 4 micrometers and an extra-planar fringe field amplifier height of 375 micrometers, Horizontal dot spacing HDS1 is 4 micrometers, horizontal dot spacing HDS2 is 16 micrometers, vertical dot spacing VDS1 is 4 micrometers, vertical dot spacing VDS2 is 4 micrometers, vertical dot spacing VDS3 is 30 micrometers, and amplifier depth spacing ADS is 0.4 micrometers.

Figure 7A:
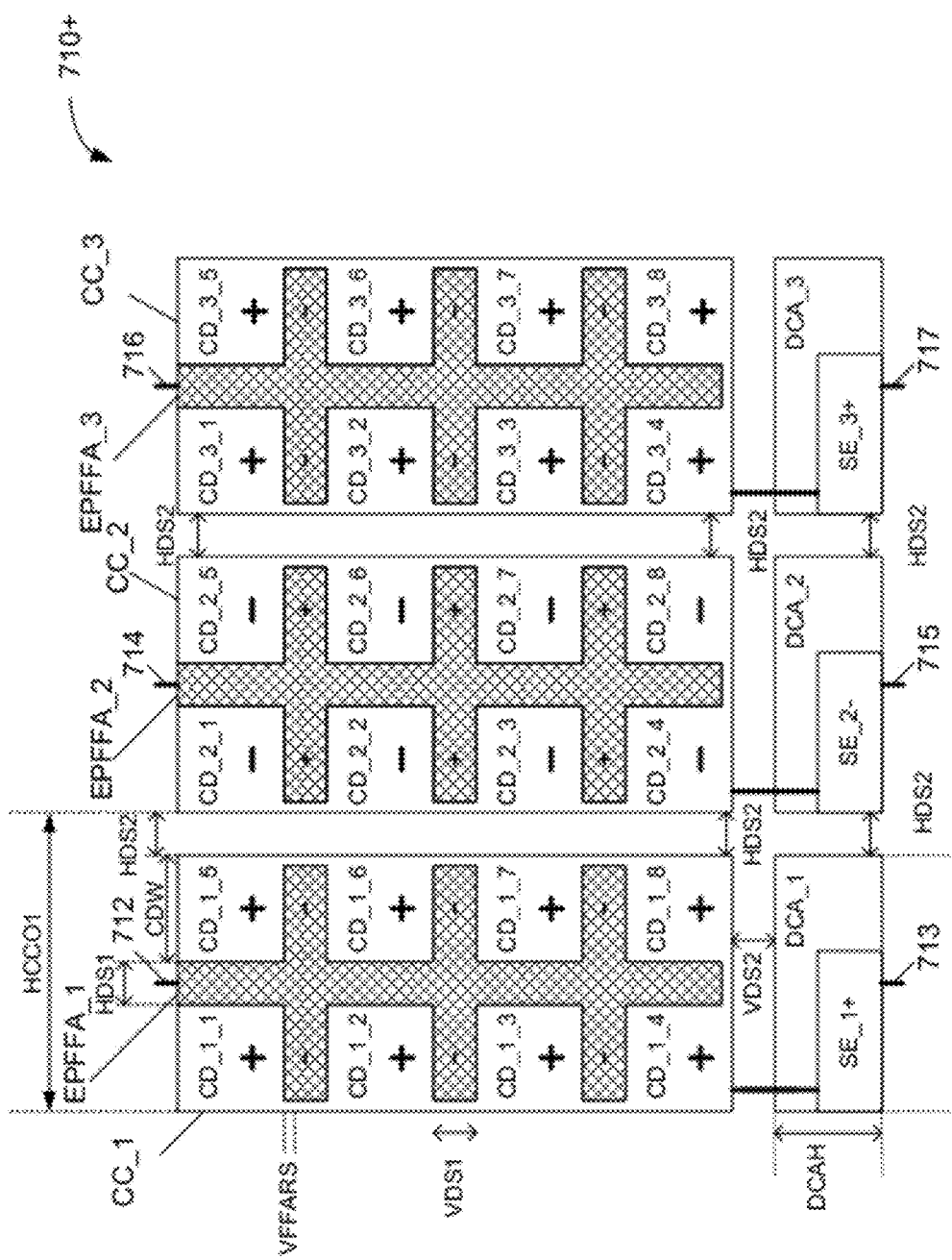
FIGS. 7(a)-7(d) illustrate a pixel design in accordance with one embodiment of the present invention.
Figure 7B:
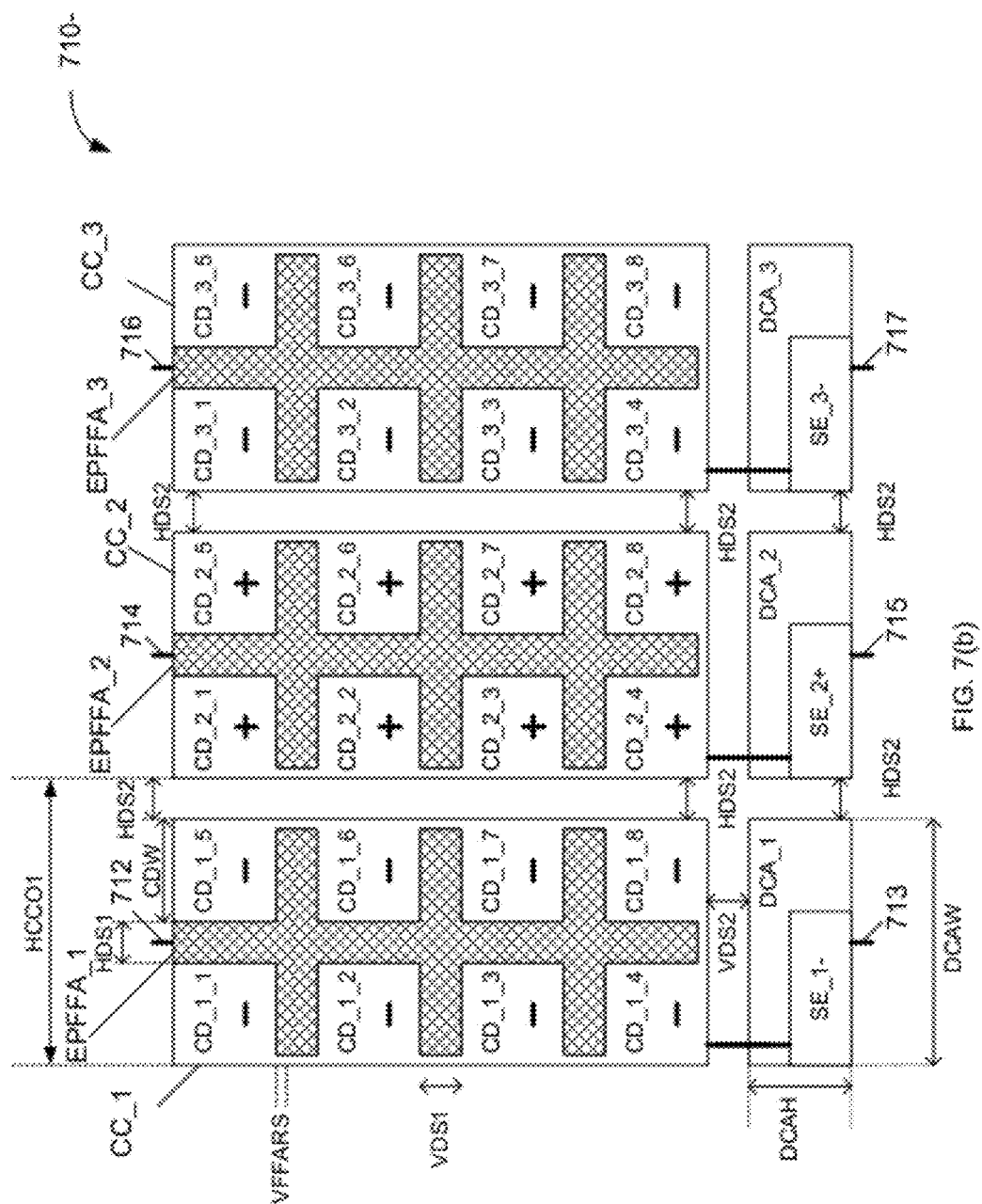

FIGS. 7(a) and 7(b) show different dot polarity patterns of a pixel design 710 (labeled 710+ and 710−) that can be used in displays having a switching element point inversion driving scheme. In actual operation a pixel will switch between a first dot polarity pattern and a second dot polarity pattern between each image frame. Specifically, in FIG. 7(a), pixel design 710 has a positive dot polarity pattern (and is thus labeled 710+) and in FIG. 7(b), pixel design 710 has a negative dot polarity pattern (and is thus labeled 710−). Furthermore, the polarity of each polarized component in the various pixel designs are indicated with "+" for positive polarity or "−" for negative polarity.

Pixel design 710 has three color components CC_1, CC_2 and CC_3. Each of the three color components includes eight color dots. The large number of color dots in each color component makes pixel design 710 well suited for large screen displays. Pixel design 710 also includes a switching element (referenced as SE_1, SE_2, and SE_3) for each color component and a extra-planar fringe field amplifier (referenced as EPFFA_1, EPFFA_2, and EPFFA_3) for each color component. Switching elements SE_1, SE_2, and SE_3 are arranged in a row. Device component areas DCA_1, DCA_2, and DCA_3 are defined around switching element SE_1, SE_2, and SE_3. Device component areas DCA_1, DCA_2, and DCA_3 have a device component area height DCAH and a device component width DCAW.

The eight color dots of first color component CC_1 of pixel design 710 dots arranged in an array having two columns of four color dots. The two columns are vertically aligned so that the eight color dots also form four rows of color dots. The columns of color dots are separated by a first horizontal dot spacing HDS1. Each vertically adjacent color dot in a column is separated by a first vertical dot spacing VDS1. Specifically, in the first column of color dots, color dot CD_1_1 is above color dot CD_1_2, which is above color dot CD_1_3, which is above color dot CD_1_4. In the second column of color dots, which is to the right of the first column of color dots and separated from the first column by first horizontal dot spacing HDS1, color dot CD_1_5 is above color dot CD_1_6, which is above color dot CD_1_7, which is above color dot CD_1_8. (As explained above in the notation "color dot CD_X_Y", X specifies a color component CC_X within a pixel, while Y specifies the color dots within color component CC_X.) The color dots are electrically coupled along the outer edge of the array of color dots, except for the space between color dots CD_1_1 and CD_1_5. Specifically, the bottom right corner of color dot CD_1_5 is coupled to the top right corner of color dot CD_1_6; the bottom right corner of color dot CD_1_6 is coupled to the top right corner of color dot CD_1_7, the bottom right corner of color dot CD_1_7 is coupled to the top right corner of color dot CD_1_8; the bottom left corner of color dot CD_1_8 is coupled to the bottom right corner of color dot CD_1_4; the top left corner of color dot CD_1_4 is coupled to the bottom left corner of color dot CD_1_3; the top left corner of color dot CD_1_3 is coupled to the bottom left corner of color dot CD_1_2; and the top left corner of color dot CD_1_2 is coupled to the bottom left corner of color dot CD_1_1. To lower manufacturing cost, the color dots and the connections between the color dots can be formed in a single process. However, some embodiments of the present invention may use different process steps to form the color dots and to couple the color dots. Furthermore, some embodiments may couple the color dots of the color component in different locations.

Device component area DCA_1, which is located below color dot CD_1_4 and color dot CD_1_8, is separated from color dot CD_1_4 and color dot CD_1_8 by a vertical dot spacing VDS2. Switching element SE_1 is located within device component area DCA_1. Switching element SE_1 is coupled to the electrodes of the color dots of color component CC_1 (i.e. color dots CD_1_1, CD_1_2, CD_1_3, CD_1_4, CD_1_5, CD_1_6, CD_1_7, and CD_1_8) to control the voltage polarity and voltage magnitude of the color dots of color component CC_1. In some embodiments of the present invention, color dots may overlap the device component areas.

Similarly, second color component CC_2 of pixel design 710 also has eight color dots arranged in an array having two columns of four color dots. The two columns are vertically aligned so that the eight color dots also form four rows of color dots. Specifically, in the first column of color dots, color dot CD_2_1 is above color dot CD_2_2, which is above color dot CD_2_3, which is above color dot CD_2_4. In the second column of color dots, which is to the right of the first column of color dots, color dot CD_2_5 is above color dot CD_2_6, which above color dot CD_2_7, which is above color dot CD_2_8. The color dots are electrically coupled along the outer edge of the array of color dots, except for the space between color dots CD_2_1 and CD_2_5. Specifically, the bottom right corner of color dot CD_2_5 is coupled to the top right corner of color dot CD_2_6; the bottom right corner of color dot CD_2_6 is coupled to the top right corner of color dot CD_2_7, the bottom right corner of color dot CD_2_7 is coupled to the top right corner of color dot CD_2_8; the bottom left corner of color dot CD_2_8 is coupled to the bottom right corner of color dot CD_2_4; the top left corner of color dot CD_2_4 is coupled to the bottom left corner of color dot CD_2_3; the top left corner of color dot CD_2_3 is coupled to the bottom left corner of color dot CD_2_2; and the top left corner of color dot CD_2_2 is coupled to the bottom left corner of color dot CD_2_1.

Device component area DCA_2, which is located below color dot CD_2_4 and color dot CD_2_8, is separated from color dot CD_2_4 and color dot CD_2_8 by vertical dot spacing VDS2. Switching element SE_2 is located within device component area DCA_2. Switching element SE_2 is coupled to the electrodes of the color dots of color component CC_2 (i.e. color dots CD_2_1, CD_2_2, CD_2_3, CD_2_4, CD_2_5, CD_2_6, CD_2_7, and CD_2_8) to control the voltage polarity and voltage magnitude of the color dots of color component CC_2. Second color component CC_2 is vertically aligned with first color component CC_1 and separated from color component CC_1 by a second horizontal dot spacing HDS2, thus color components CC_2 and CC_1 are horizontally offset by a horizontal color component offset HCCO1, which is equal to a the sum of horizontal dot spacing HDS1 plus horizontal dot spacing HDS2 plus two times the color dot width CDW. In one embodiment of the present invention, horizontal dot spacing HDS2 is larger than horizontal dot spacing HDS1. In this embodiment the larger distance allows a signal line, such as a source line for the switching elements, to run color component CC_1 and color component CC_2.

Specifically with regards to the color dots, color dot CD_2_1 is vertically aligned with color dots CD_1_5 and horizontally separated by horizontal dot spacing HDS2. Similarly, color dots CD_2_2, CD_2_3, and CD_2_4, are vertically aligned with color dots CD_1_6, CD_1_7, and CD_1_8, respectively, and horizontally separated by horizontal dot spacing HDS2.

Similarly, third color component CC_3 of pixel design 710 also has eight color dots arranged in an array having two columns of four color dots. The two columns are vertically aligned so that the eight color dots also form four rows of color dots. Specifically, in the first column of color dots, color dot CD_3_1 is above color dot CD_3_2, which is above color dot CD_3_3, which is above color dot CD_3_4. In the second column of color dots, which is to the right of the first column of color dots, color dot CD_3_5 is above color dot CD_3_6, which is above color dot CD_3_7, which is above color dot CD_3_8. The color dots are electrically coupled along the outer edge of the array of color dots, except for the space between color dots CD_3_1 and CD_3_5. Specifically, the bottom right corner of color dot CD_3_5 is coupled to the top right corner of color dot CD_3_6; the bottom right corner of color dot CD_3_6 is coupled to the top right corner of color dot CD_3_7, the bottom right corner of color dot CD_3_7 is coupled to the top right corner of color dot CD_3_8; the bottom left corner of color dot CD_3_8 is coupled to the bottom right corner of color dot CD_3_4; the top left corner of color dot CD_3_4 is coupled to the bottom left corner of color dot CD_3_3; the top left corner of color dot CD_3_3 is coupled to the bottom left corner of color dot CD_3_2; and the top left corner of color dot CD_3_2 is coupled to the bottom left corner of color dot CD_3_1.

Device component area DCA_3, which is located below color dot CD_3_4 and color dot CD_3_8, is separated from color dot CD_3_4 and color dot CD_3_8 by vertical dot spacing VDS2. Switching element SE_3 is located within device component area DCA_3. Switching element SE_3 is coupled to the electrodes of the color dots of color component CC_3 (i.e. color dots CD_3_1, CD_3_2, CD_3_3, CD_3_4, CD_3_5, CD_3_6, CD_3_7, and CD_3_8) to control the voltage polarity and voltage magnitude of the color dots of color component CC_3. Third color component CC_3 is vertically aligned with second color component CC_2 and separated from color component CC_2 by horizontal dot spacing HDS2, thus color components CC_3 and CC_2 are horizontally offset by horizontal color component offset HCCO1. Specifically with regards to the color dots, color dot CD_3_1 is vertically aligned with color dots CD_2_5 and horizontally separated by horizontal dot spacing HDS2. Similarly, color dots CD_3_2, CD_3_3, and CD_3_4, are vertically aligned with color dots CD_2_6, CD_2_7, and CD_2_8, respectively, and horizontally separated by horizontal dot spacing HDS2.

Figure 7C:
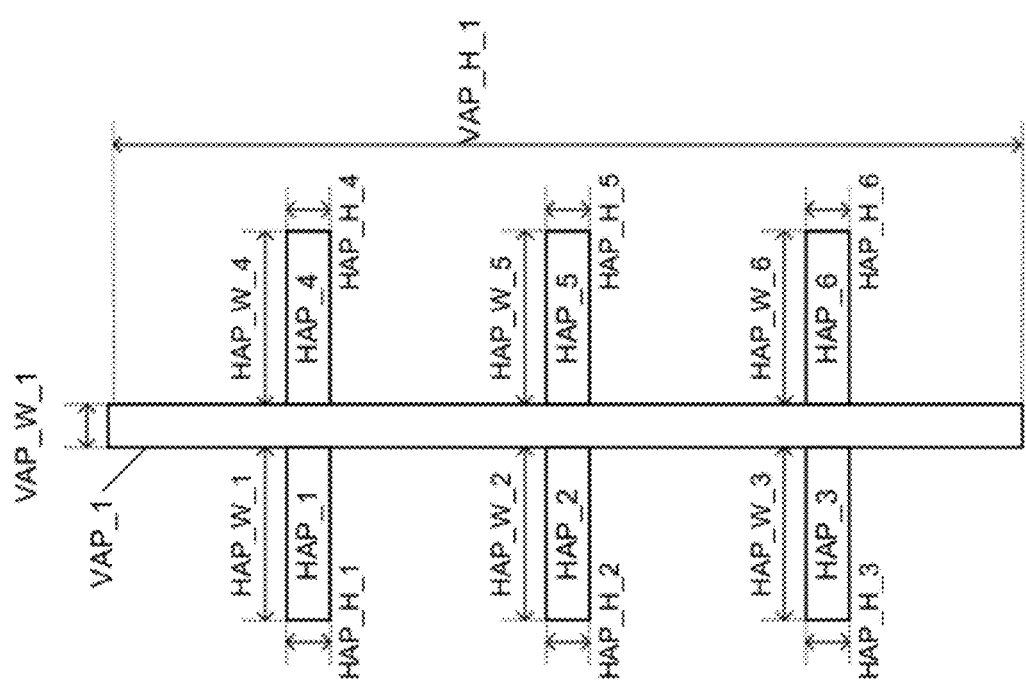
Figure 7T:
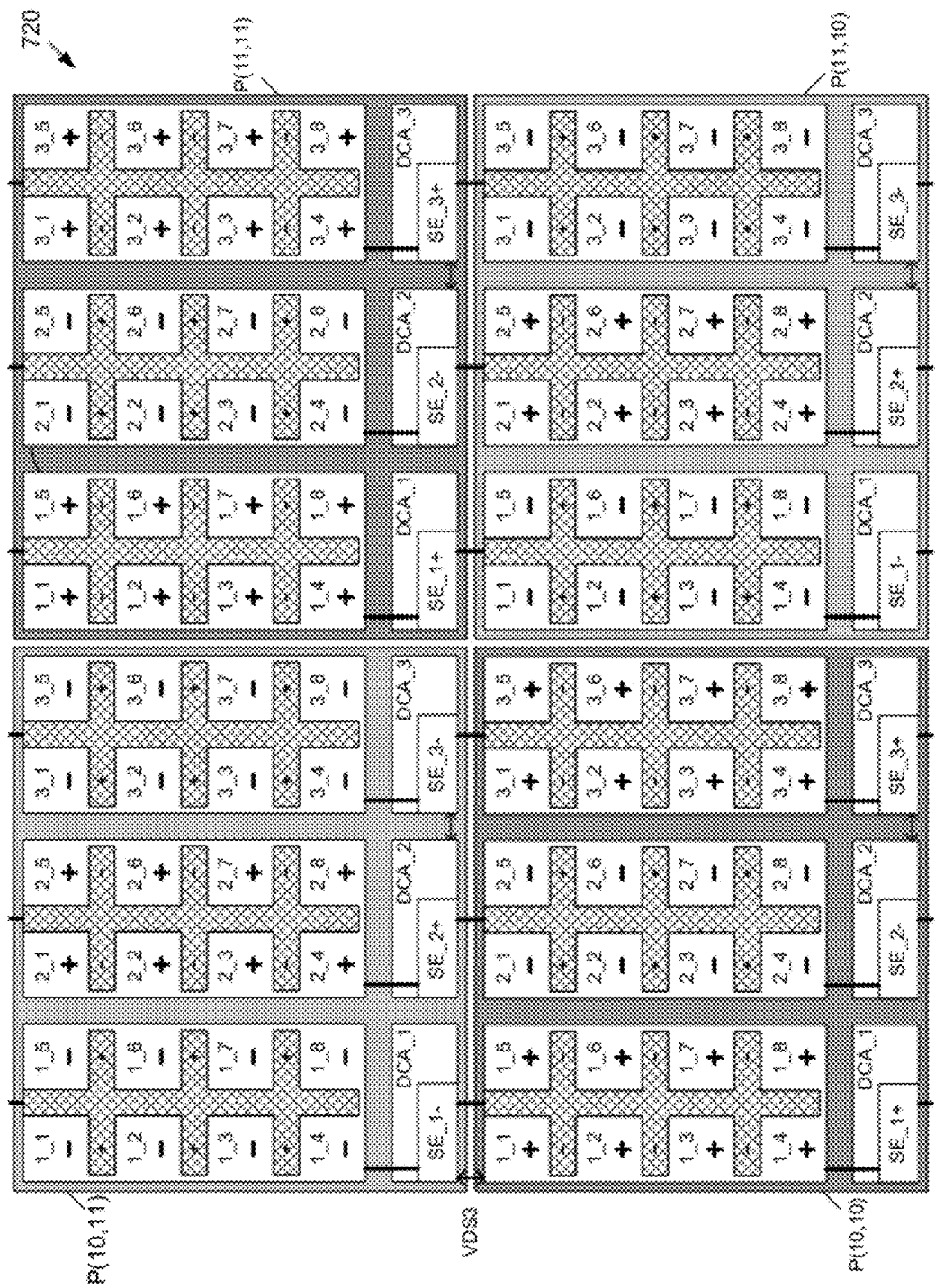

Pixel design 710 also includes extra-planar fringe field amplifiers EPFFA_1, EPFFA_2, and EPFFA_3. FIG. 7(c)

shows a more detailed view of extra-planar fringe field amplifier EPFFA_1 of pixel design 710. For clarity extra-planar fringe field amplifiers EPFFA_1 is conceptually divided into a first vertical amplifying portion VAP_1, a first horizontal amplifying portion HAP_1, a second horizontal amplifying portion HAP_2, a third horizontal amplifying portion HAP_3, a fourth horizontal amplifying portion HAP_4, a fifth horizontal amplifying portion HAP_5, and a sixth horizontal amplifying portion HAP_6. Horizontal amplifying portion HAP_1 is adjacent to vertical amplifying portion VAP_1 and extends to the left. Vertically, horizontal amplifying portion HAP_1 is located approximately at one quarter of the height of vertical amplifying portion VAP_1 (i.e. VAP_H_1) from the top of vertical amplifying portion VAP_1. Horizontal amplifying portion HAP_2 is vertically centered on and extends to the left of vertical amplifying portion VAP_1. Horizontal amplifying portion HAP_3 is vertically located approximately one quarter of the height of vertical amplifying portion VAP_1 from the bottom of vertical amplifying portion VAP_1 extends to the left of vertical amplifying portion VAP_1. Horizontal amplifying portion HAP_4 is vertically aligned with horizontal amplifying portion HAP_1 and is adjacent to but extends to the right of vertical amplifying portion VAP_1. Horizontal amplifying portion HAP_5 is vertically aligned with horizontal amplifying portion HAP_2 and is adjacent to but extends to the right of vertical amplifying portion VAP_1. Horizontal amplifying portion HAP_6 is vertically aligned with horizontal amplifying portion HAP_3 and is adjacent to but extends to the right of vertical amplifying portion VAP_1. As explained above, use of horizontal amplifying portions and vertical amplifying portions allows clearer description of the placement of extra-planar fringe field amplifier EPFFA1. Horizontal amplifying portions HAP_1, HAP_2, HAP_3, HAP_4, HAP_5, and HAP_6 have horizontal amplifying portion width HAP_W_1, HAP_W_2, HAP_W_3, HAP_W_4, HAP_W_5, and HAP_W_6 respectively, and horizontal amplifying portion height HAP_H_1, HAP_H_2, HAP_H_3, HAP_H_4, HAP_H_5, and HAP_H_6, respectively. In the particular embodiment of FIGS. 7(a)-7(d), the horizontal amplifying portion heights are the same and the horizontal amplifying portion widths are the same. Vertical amplifying portions VAP_1 has vertical amplifying portion width VAP_W_1 and vertical amplifying portion height VAP_H_1. Extra-planar fringe field amplifiers EPFFA_2 and EPFFA_3 have the same shape as extra-planar fringe field amplifier EPFFA_1.

As shown in FIG. 7(a), extra-planar fringe field amplifiers EPFFA_1, EPFFA_2, and EPFFA_3 are placed within color components CC_1, CC_2, and CC_3, respectively. However, the extra-planar fringe field amplifiers are on a different plane than the plane containing the color dots. Extra-planar fringe field amplifier EPFFA_1 is placed so that horizontal amplifying portion HAP_1 of extra-planar fringe field amplifier EPFFA_1 lies in between color dots CD_1_1 and CD_1_2. Horizontal amplifying portion HAP_1 of extra-planar fringe field amplifier EPFFA_1 does not extend to the end of the left side of color dots CD_1_1 and CD_1_2 due to the interconnection between color dots CD_1_1 and CD_1_2. Similarly, horizontal amplifying portion HAP_2 of extra-planar fringe field amplifier EPFFA_1 lies in between color dots CD_1_2 and CD_1_3; horizontal amplifying portion HAP_3 of extra-planar fringe field amplifier EPFFA_1 lies in between color dots CD_1_3 and CD_1_4; horizontal amplifying portion HAP_4 of extra-planar fringe field amplifier EPFFA_1 lies in between color dots CD_1_5 and CD_1_6; horizontal amplifying portion HAP_5 of extra-planar fringe field amplifier EPFFA_1 lies in between color dots CD_1_6 and CD_1_7; and horizontal amplifying portion HAP_6 of extra-planar fringe field amplifier EPFFA_1 lies in between color dots CD_1_7 and CD_1_8. Vertical amplifying portion VAP_1 of extra-planar fringe field amplifier EPFFA_1 is placed in between color dots CD_1_1 and CD_1_5, in between color dots CD_1_2 and CD_1_6, in between color dots CD_1_3 and CD_1_7, and in between color dots CD_1_4 and CD_1_8. Extra-planar fringe field amplifier EPFFA_1 extends along the right side and the bottom of color dot CD_1_1; the top, the right side, and the bottom of color dots CD_1_2 and CD_1_3; the top and the right side of CD_1_4; the left side and the bottom of color dot CD_1_5; the top, the left side, and the bottom of color dots CD_1_6 and CD_1_7; and the top and left side of color dot CD_1_8.

Extra-planar fringe field amplifiers EPFFA_2 and EPFFA_3 is placed within color components CC_2 and CC_3, respectively, in the same manner as described above with respect to extra-planar fringe field amplifier EPFFA_1 and color component CC_1.

Pixel design 710 is designed so that the extra-planar fringe field amplifiers can receive polarity from an adjacent pixel. Specifically, a first conductor is coupled to an extra-planar fringe field amplifier to receive polarity from the pixel above the current pixel and a second conductor is coupled to the switching element to provide polarity to an extra-planar fringe field amplifier of a pixel below the current pixel. For example, conductor 712, which is coupled to the electrode of extra-planar fringe field amplifier EPFFA_1, extends upward to connect to the equivalent conductor of conductor 713 of a pixel above the current pixel to receive polarity. (see FIG. 7(d)). Conductor 713, which is coupled to switching element SE_1 extends downward to connect to the equivalent conductor of conductor 712 in the pixel below the current pixel. Conductors 714 and 715 serve the same purpose for extra-planar fringe field amplifier EPFFA_2 as conductors 712 and 713 for extra-planar fringe field amplifier EPFFA_1. In addition, conductors 716 and 717 serve the same purpose for extra-planar fringe field amplifier EPFFA_3 as conductors 712 and 713 for extra-planar fringe field amplifier EPFFA_1.

The polarities of the color dots, extra-planar fringe field amplifiers, and switching elements are shown using "+" and "−" signs. Thus, in FIG. 7(a), which shows the positive dot polarity pattern of pixel design 710+, switching elements SE_1, and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and extra-planar fringe field amplifier EPFFA_2 have positive polarity. However, switching element SE_2; color dots CD_2_1, CD_2_2, CD_2_3, CD_2_4, CD_2_5, CD_2_6, CD_2_7, and CD_2_8; and extra-planar fringe field amplifiers EPFFA_1 and EPFFA_3 have negative polarity.

FIG. 7(b) shows pixel design 710 with the negative dot polarity pattern. For the negative dot polarity pattern, switching elements SE_1, and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and extra-planar fringe field amplifier EPFFA_2 have negative polarity. However, switching element SE_2; color dots CD_2_1, CD_2_2, CD_2_3, CD_2_4, CD_2_5, CD_2_6, CD_2_7, and CD_2_8; and extra-planar fringe field amplifiers EPFFA_1 and EPFFA_3 have positive polarity.

As explained above fringe fields in each of the color dots are amplified if adjacent components have opposite polarities. Pixel design 710 makes use of the extra-planar fringe field amplifiers to further enhance the formation of multiple domain liquid crystal structure. In general, the polarities of the polarized components are assigned so that a color dot of a first polarity has neighboring polarized components of the second polarity. More specifically for pixel design 710, each color dot is surrounded on two or three sides by portions of an extra-planar fringe field amplifier of an opposite polarity. Furthermore, the color dots also are adjacent to a color dot of opposite polarity. For example for the positive dot polarity pattern of pixel design 710 (FIG. 7(a)), color dot CD_1_6 has positive polarity and is adjacent to portions of extra-planar fringe field amplifiers EPFFA_1 (which has a negative polarity) at the top, the left side, and bottom of color dot CD_1_6. Furthermore, color dot CD_2_2, which has a negative polarity, is on the right side of color dot CD_1_6. Thus, the fringe field of color dot CD_1_6 is amplified.

Pixels using pixel design 710 of FIGS. 7(a) and 7(b) can be used in displays using switching element point inversion driving schemes. FIG. 7(d) shows a portion of display 720 using pixels P(10, 10), P(11, 10), P(10, 11), and P(11, 11) of pixel design 710 with a switching element point inversion driving scheme. Display 720 could have thousands of rows with thousand of pixels on each row. The rows and columns would continue from the portion shown in FIG. 7(d) in the manner shown in FIG. 7(d). For clarity, the gate lines and source lines that control the switching elements are omitted in FIG. 7(d). To better illustrate each pixel, the area of each pixel is shaded; this shading is only for illustrative purposes in FIG. 7(d) and has no functional significance. Furthermore, due to space limitations, color dots are labeled with "X_Y" rather than "CD_X_Y" in FIG. 7(d).

In display 720 the pixels are arranged so that pixels in a row alternate dot polarity patterns (positive or negative) and pixels in a column also alternate between positive and negative dot polarity pattern. Thus, pixels P(10, 10) and P(11, 11) have positive dot polarity pattern and pixels P(10, 11) and P(11, 10) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by horizontal dot spacing HDS2. Pixels on a column of pixels are horizontally aligned and separated by a vertical dot spacing VDS3.

As stated above, the extra-planar fringe field amplifiers of a first pixel receive polarity from the switching elements of a second pixel. For example, the electrode of extra-planar fringe field amplifier EPFFA_1 of pixel P(10, 10) is coupled to switching elements SE_1 of pixel P(10, 11) via conductor 712 of pixel P(10, 10) and conductor 713 of pixel P(10, 11). Similarly, the electrode of extra-planar fringe field amplifier EPFFA_2 of pixel P(10, 10) is coupled to switching elements SE_2 of pixel P(10, 11) via conductor 714 of pixel P(10, 10) and conductor 715 of pixel P(10, 11). In addition, the electrode of extra-planar fringe field amplifier EPFFA_3 of pixel P(10, 10) is coupled to switching elements SE_3 of pixel P(10, 11) via conductor 717 of pixel P(10, 10) and conductor 717 of pixel P(10, 11).

In a particular embodiment of the present invention, each color dot has a width of 140 micrometers and a height of 420 micrometers. Each extra-planar fringe field amplifier has a vertical amplifying portion width of 112 micrometers, a vertical amplifying portion height of 380 micrometers. Horizontal dot spacing HDS1 is 4 micrometers, horizontal dot spacing HDS2 is 16 micrometers, vertical dot spacing VDS1 is 4 micrometers, vertical dot spacing VDS2 is 4 micrometers, vertical dot spacing VDS3 is 30 micrometers, and amplifier depth spacing ADS is 0.4 micrometers.

Figure 8A:
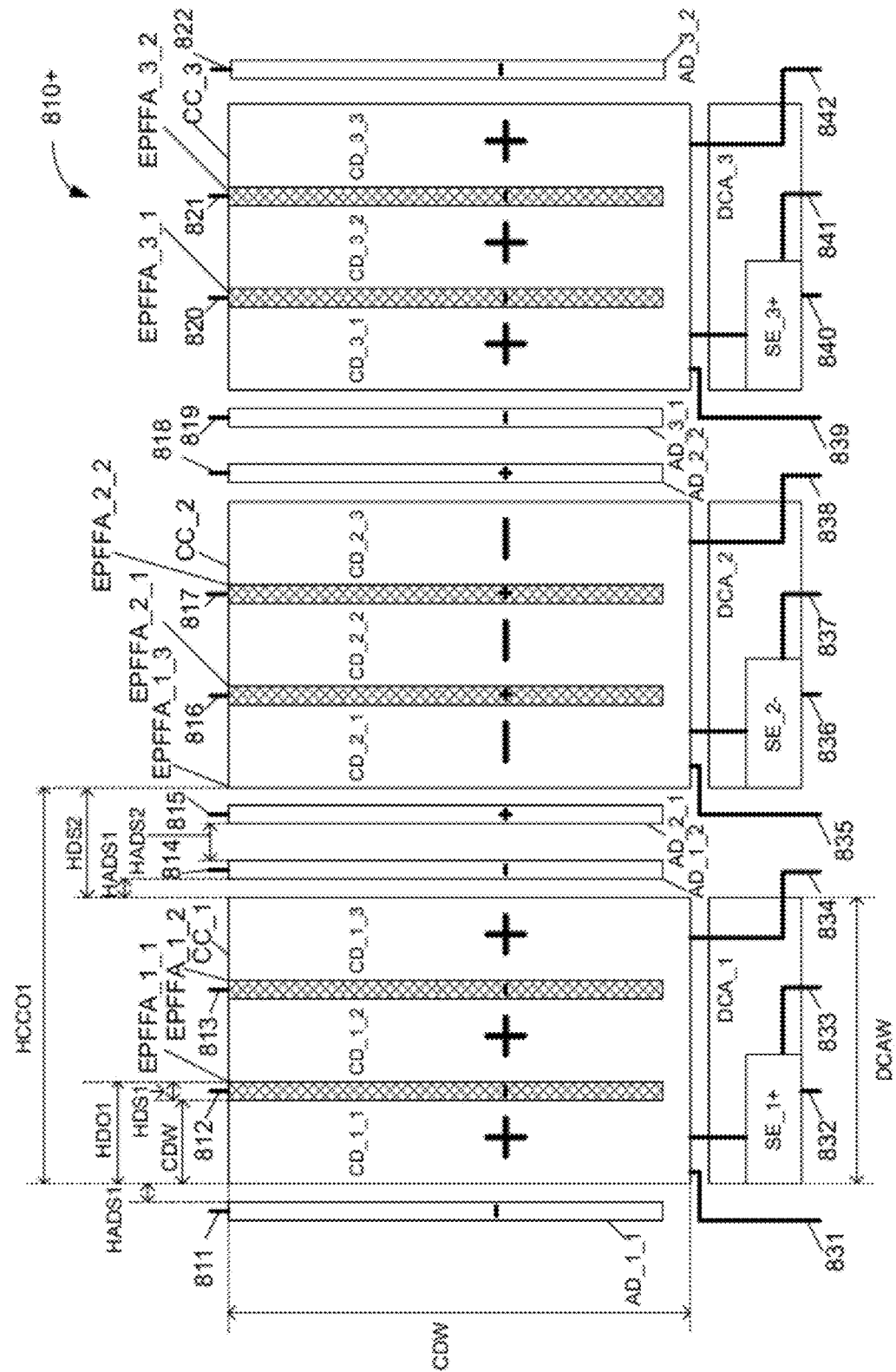
FIGS. 8(a)-8(c) illustrate a pixel design in accordance with one embodiment of the present invention.
Figure 8B:
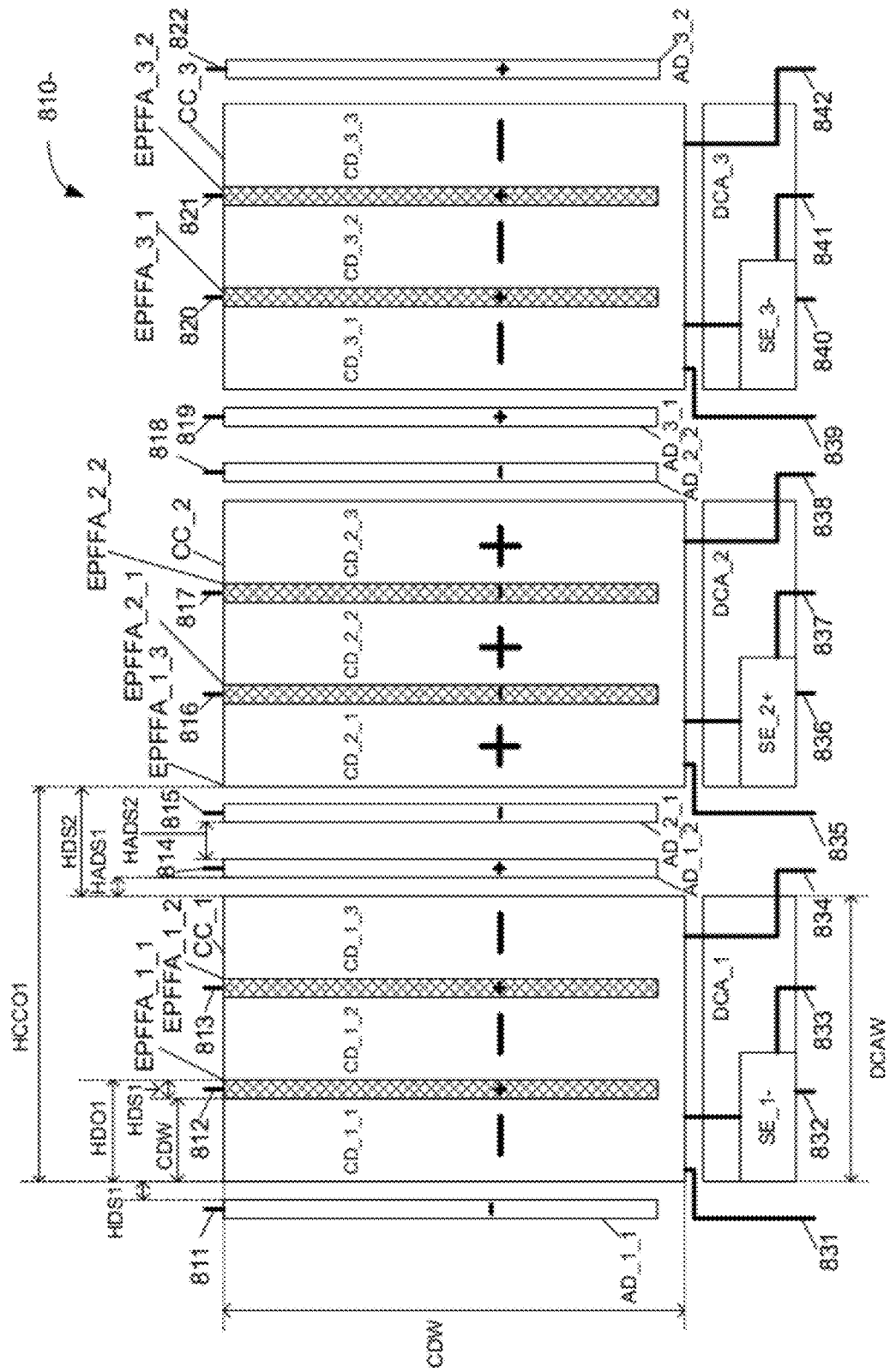

FIGS. 8(a) and 8(b) show different dot polarity patterns of a pixel design 810 that is often used in displays having a switching element point inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 8(a), pixel design 810 has a positive dot polarity pattern (and is thus labeled 810+) and in FIG. 8(b), pixel design 810 has a negative dot polarity pattern (and is thus labeled 810−). Furthermore, the polarity of each polarized component in the various pixel designs are indicated with "+" for positive polarity or "−" for negative polarity.

Pixel design 810 has three color components CC_1, CC_2 and CC_3. Each of the three color components includes three color dots. For clarity, the color dots are referenced as CD_X_Y, where X is a color component (from 1 to 3 in FIGS. 8(a)-8(b)) and Y is a color dot number (from 1 to 3 in FIGS. 8(a)-8(b)). Pixel design 810 also includes a switching element (referenced as SE_1, SE_2, and SE_3) for each color component, two polarized extra-planar fringe field amplifier for each color component (referenced as EPFFA_I_J, where I is the color component and J is the extra-planer fringe field amplifier number), and two associated dots for each color component (referenced as AD_M_N, where M is the color component and N is the associated dot number). Switching elements SE_1, SE_2, and SE_3 are arranged in a row. A device component area is shown around each of switching element SE_1, SE_2, and SE_3 and labeled DCA_1, DCA_2, and DCA_3, respectively.

First color component CC_1 of pixel design 810 has three color dots CD_1_1, CD_1_2, and CD_1_3. Color dots CD_1_1, CD_1_2, and CD_1_3, form a row and are separated by horizontal dot pacing HDS1. In other words, color dots CD_1_1, CD_1_2, and CD_1_3 are vertically aligned and horizontally separated by horizontal dot spacing HDS1. Furthermore, color dots CD_1_1 and CD_1_2 are horizontally offset by horizontal dot offset HDO1 which is equal to horizontal dot spacing HDS1 plus the color dot width CDW. However, color dots CD_1_1 and CD_1_2 are electrically connected at the bottom of color dots CD_1_1 and CD_1_2. Similarly, color dots CD_1_2 and color dots CD_1_3 are electrically connected at the bottom of color dots CD_1_2 and CD_1_3. In pixel design 810, switching element SE_1 is located below color component CC_1. Switching element SE_1 is coupled to the electrodes of color dots CD_1_1, CD_1_2, and CD_1_3 to control the voltage polarity and voltage magnitude of color dots CD_1_1, CD_1_2, and CD_1_3.

Similarly, second color component CC_2 of pixel design 810 has three color dots CD_2_1, CD_2_2, and CD_2_3. Color dots CD_2_1, CD_2_2, and CD_2_3 are also placed in a row and are separated by horizontal dot spacing HDS1. Thus, color dots CD_2_1, CD_2_2, and CD_2_3 are vertically aligned and horizontally, separated by horizontal dot spacing HDS1. However, color dots CD_2_1 and CD_2_2 are electrically connected at the bottom of color dots CD_2_1 and CD_2_2. Similarly, color dots CD_2_2 and color dots CD_2_3 are electrically connected at the bottom of color dots CD_2_2 and CD_2_3. Switching element SE_2 is located below color component CC_2. Switching element SE_2 is coupled to the electrodes of color dots CD_2_1, CD_2_2, and CD_2_3 to control the voltage polarity and voltage magnitude of color dots CD_2_1, CD_2_2, and CD_2_3. Second color component CC_2 is vertically aligned with first color component CC_1 and separated from color component CC_1 by a horizontal dot spacing HDS2, thus color components CC_2 and CC_1 are horizontally offset by a horizontal color component offset HCCO1, which is equal to two times horizontal dot spacing HDS1 plus three times color dot width CDW plus horizontal dot spacing HDS2.

Similarly, third color component CC_3 of pixel design 810 has three color dots CD_3_1, CD_3_2, and CD_3_3. Color dots CD_3_1, CD_3_2, and CD_3_3 are also placed in a row and are separated by horizontal dot spacing HDS1. Thus, color dots CD_3_1, CD_3_2, and CD_3_3 are vertically aligned and horizontally separated by horizontal dot spacing HDS1. However, color dots CD_3_1 and CD_3_2 are electrically connected at the bottom of color dots CD_3_1 and CD_3_2. Similarly, color dots CD_3_2 and color dots CD_3_3 are electrically connected at the bottom of color dots CD_3_2 and CD_3_3. Switching element SE_3 is located below color component CC_3. Switching element SE_3 is coupled to the electrodes of color dots CD_3_1, CD_3_2, and CD_3_3 to control the voltage polarity and voltage magnitude of color dots CD_3_1, CD_3_2, and CD_3_3. Third color component CC_3 is vertically aligned with second color component CC_2 and separated from color component CC_2 by horizontal dot spacing HDS2, thus color components CC_3 and CC_2 are horizontally offset by a horizontal color component offset HCCO1.

For clarity, the color dots of pixel design 810 are illustrated with color dots having the same color dot width CDW. Furthermore, all the color dots in pixel design 810 have the same color dot height CDH. However, some embodiments of the present invention may have color dots with different color dot widths and different color dot heights.

Pixel design 810 also includes extra-planar fringe field amplifiers EPFFA_1_1, EPFFA_1_2, EPFFA_2_1, EPFFA_2_2, EPFFA_3_1, and EPFFA_3_2. In pixel design 810, the extra-planar fringe field amplifiers are rectangular with an extra-planar fringe field amplifier width EPFFAW (not labeled in FIG. 8(a)) and an extra-planar fringe field amplifier height EPFFAH (not labeled in FIG. 8(a)).

As shown in FIG. 8(a), the extra-planar fringe field amplifiers are placed in between the color dots of pixel design 810. Specifically, extra-planar fringe field amplifier EPFFA_1_1 is placed in between color dots CD_1_1 and CD_1_2 and extra-planar fringe field amplifier EPFFA_1_2 is placed between color dots CD_1_2 and CD_1_3. Similarly, extra-planar fringe field amplifier EPFFA_2_1 is placed in between color dots CD_2_1 and CD_2_2, extra-planar fringe field amplifier EPFFA_2_2 is placed between color dots CD_1_2 and CD_1_3, extra-planar fringe field amplifier EPFFA_3_1 is placed in between color dots CD_3_1 and CD_3_2, extra-planar fringe field amplifier EPFFA_3_2 is placed between color dots CD_3_2 and CD_3_3. Although it appears from FIGS. 8(a) and 8(b) that the color dots are touching the extra-planar fringe field amplifiers, the extra-planar fringe field amplifiers actually lie in a different plane in the same manner as illustrated in FIG. 5(c) for pixel design 510.

Specifically, the extra-planar fringe field amplifiers of pixel design 810 are below the color dots. More specifically, the top of the extra planar fringe field amplifiers are separated from bottom of the color dots by an amplifier depth spacing ADS. In other embodiments of the present invention the extra-planar fringe field amplifiers can be above the color dots. In these embodiments amplifier depth spacing ADS is measured from the top of the color dots to the bottom of the extra-planar fringe field amplifiers.

Thus, extra-planar fringe field amplifier EPFFA_1_2 can be described as horizontally adjacent to color dot CD_1_1 and horizontally adjacent to color dot CD_1_2 but on a different plane relative to color dots CD_1_1 and CD_1_2. Extra-planar fringe field amplifier EPFFA_1_2 can also be described as horizontally in between color dots CD_1_1 and CD_1_2 but on a lower plane relative to color dots CD_1_1 and CD_1_2. Similarly, extra-planar fringe field amplifiers EPFFA_1_2, EPFFA_2_1, EPFFA_2_2, EPFFA_3_1, and EPFFA_3_2 are horizontally in between color dots CD_1_2 and CD_1_3, color dots CD_2_1 and CD_2_2, color dots CD_2_2 and CD_2_3, color dots CD_3_1 and CD_3_2, and color dots CD_3_2 and CD_3_3, respectively, and on a different plane than the color dots.

By using extra-planar fringe field amplifiers, the color dots can be placed closer together as compared to using polarized elements in the plane of the color dots. Reducing the spacing of the color dots increases the brightness and contrast of the display.

For example, in pixel design 820, horizontal dot spacing HDS1 (i.e. the space between color dots within a color component) is equal to the width of the extra-planar fringe field amplifier (EPFFA_W). Other embodiments of the present invention can even have the color dots partially overlap the extra-planar fringe field amplifiers to further reduce dot spacing. Extra-planar fringe field amplifiers can be formed using any conductor. However, to minimize costs and process steps, generally, extra-planar fringe field amplifiers are formed using a metal layer that is used for the formation of the switching elements.

Pixel design 810 also includes associated dots AD_1_1, AD_1_2, AD_2_1, AD_2_2, AD_3_1, and AD_3_2. In pixel design 810, the associated dots are rectangular with an associated dot width ADW (not labeled in FIG. 8(a)) and an associated dot height ADH (not labeled in FIG. 8(a)).

As shown in FIG. 8(a), the associated dots are placed on the left side and the right side of each color component. Specifically, associated dot AD_1_1 is placed along the left side of color dot CD_1_1 and associated dot AD_1_2 is placed along the right side of color dot CD_1_3. Specifically, associated dot AD_1_1 is horizontally separated from the left side of color dot CD_1_1 by a horizontal associated dot spacing HADS1 and associated dot AD_1_2 is horizontally separated the right side of color dot CD_1_3. Similarly, associated dot AD_2_1 is placed along the left side of color dot CD_2_1 and horizontally separated from color dot CD_2_1 by horizontal associated dot spacing HADS1; and associated dot AD_2_2 is placed along the right side of color dot CD_2_3 and horizontally separated from color dot CD_2_3 by horizontal associated dot spacing HADS1. In addition, associated dot AD_3_1 is placed along the left side of color dot CD_3_1 and horizontally separated from color dot CD_3_1 by horizontal associated dot spacing HADS1; and associated dot AD_3_2 is placed along the right side of color dot CD_3_3 and horizontally separated from color dot CD_3_3 by horizontal associated dot spacing HADS1.

Pixel design 810 is designed so that the extra-planar fringe field amplifiers and associated dots can receive polarity from an adjacent pixel. Specifically, a first conductor is coupled to an extra-planar fringe field amplifier or associated dot to receive polarity from the pixel above the current pixel and a second conductor is coupled to the switching element to provide polarity to an extra-planar fringe field amplifier or associated dot of a pixel below the current pixel. In some embodiments of the present invention, the conductor is coupled to a switching element via intermediate conductors such as a color dot. For example, conductor 811, which is coupled to the electrode of associate dot AD_1_1, extends upward to connect to the equivalent conductor of conductor 821 of a pixel above the current pixel to receive polarity. (see FIG. 8(c)). Conductor 821, which is coupled to switching element SE_1 via color dot CD_1_1 extends downward to connect to the equivalent conductor of conductor 811 in the pixel below the current pixel. Conductors 814 and 834 serve the same purpose for associated dot AD_1_2. Conductor 812, which is coupled to the electrode of extra-planar fringe field amplifier EPFFA_1_1, extends upwards to connect to the equivalent conductor of conductor 822 of a pixel above the current pixel to receive polarity. Conductors 813 and 833 serve the same purpose for extra-planar fringe field amplifier EPFFA_1_2. Similarly, Conductors 814 and 824 serve the same purpose for extra-planar fringe field amplifier EPFFA_2_1.

Similarly, conductors 815 and 835 serve the same purpose for associated dot AD_2_1 as conductors 811 and 831 serve for associated dot AD_1_1. Conductors 816 and 836 serve the same purpose for extra-planar fringe field amplifier EPFFA_2_1 as conductors 812 and 832 serve for extra-planer fringe field amplifier EPFFA_1_1. Conductors 817 and 837 serve the same purpose for extra-planar fringe field amplifier EPFFA_2_2 as conductors 813 and 833 serve for extra-planer fringe field amplifier EPFFA_1_2. Conductors 818 and 838 serve the same purpose for associated dot AD_2_2 as conductors 814 and 834 serve for associated dot AD_1_2.

Similarly, conductors 819 and 839 serve the same purpose for associated dot AD_3_1 as conductors 811 and 831 serve for associated dot AD_1_1. Conductors 820 and 840 serve the same purpose for extra-planar fringe field amplifier EPFFA_3_1 as conductors 812 and 832 serve for extra-planer fringe field amplifier EPFFA_1_1. Conductors 821 and 841 serve the same purpose for extra-planar fringe field amplifier EPFFA_3_2 as conductors 813 and 833 serve for extra-planer fringe field amplifier EPFFA_1_2. Conductors 822 and 842 serve the same purpose for associated dot AD_4_2 as conductors 814 and 834 serve for associated dot AD_1_2.

The polarities of the color dots, extra-planar fringe field amplifiers, and switching elements are shown using "+" and "−" signs. Thus, in FIG. 8(a), which shows the positive dot polarity pattern of pixel design 810+, switching elements SE_1 and SE_3; color dots CD_1_1, CD_1_2, CD_1_3, CD_3_1, CD_3_2, and CD_3_3; associated dots AD_2_1 and AD_2_2; and extra-planar fringe field amplifiers EPFFA_2_1 and EPFFA_2_2 have positive polarity. However, switching element SE_2; color dots CD_2_1, CD_2_2, and CD_2_3; associated dots AD_1_1, AD_1_2, AD_3_1, and AD_3_2; and extra-planar fringe field amplifiers EPFFA_1_1, EPFFA_1_2, EPFFA_3_1, and EPFFA_3_2 have negative polarity.

FIG. 8(b) shows pixel design 810 with the negative dot polarity pattern. For the negative dot polarity pattern, switching elements SE_1 and SE_3; color dots CD_1_1, CD_1_2, CD_1_3, CD_3_1, CD_3_2, and CD_3_3; associated dots AD_2_1 and AD_2_2; and extra-planar fringe field amplifiers EPFFA_2_1 and EPFFA_2_2 have negative polarity. However, switching element SE_2; color dots CD_2_1, CD_2_2, and CD_2_3; associated dots AD_1_1, AD_1_2, AD_3_1, and AD_3_2; and extra-planar fringe field amplifiers EPFFA_1_1, EPFFA_1_2, EPFFA_3_1, and EPFFA_3_2 have positive polarity.

As explained above fringe fields in each of the color dots are amplified if adjacent components have opposite polarities. Pixel design 810 makes use of the associated dots and extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 810 (FIG. 8(a)), color dot CD_1_3 has positive polarity. However the neighboring polarized components (extra-planar fringe field amplifier EPFFA_1_2 and associated dot AD_1_2) have negative polarity. Thus, the fringe field of color dot CD_1_3 is amplified.

Figure 8C:
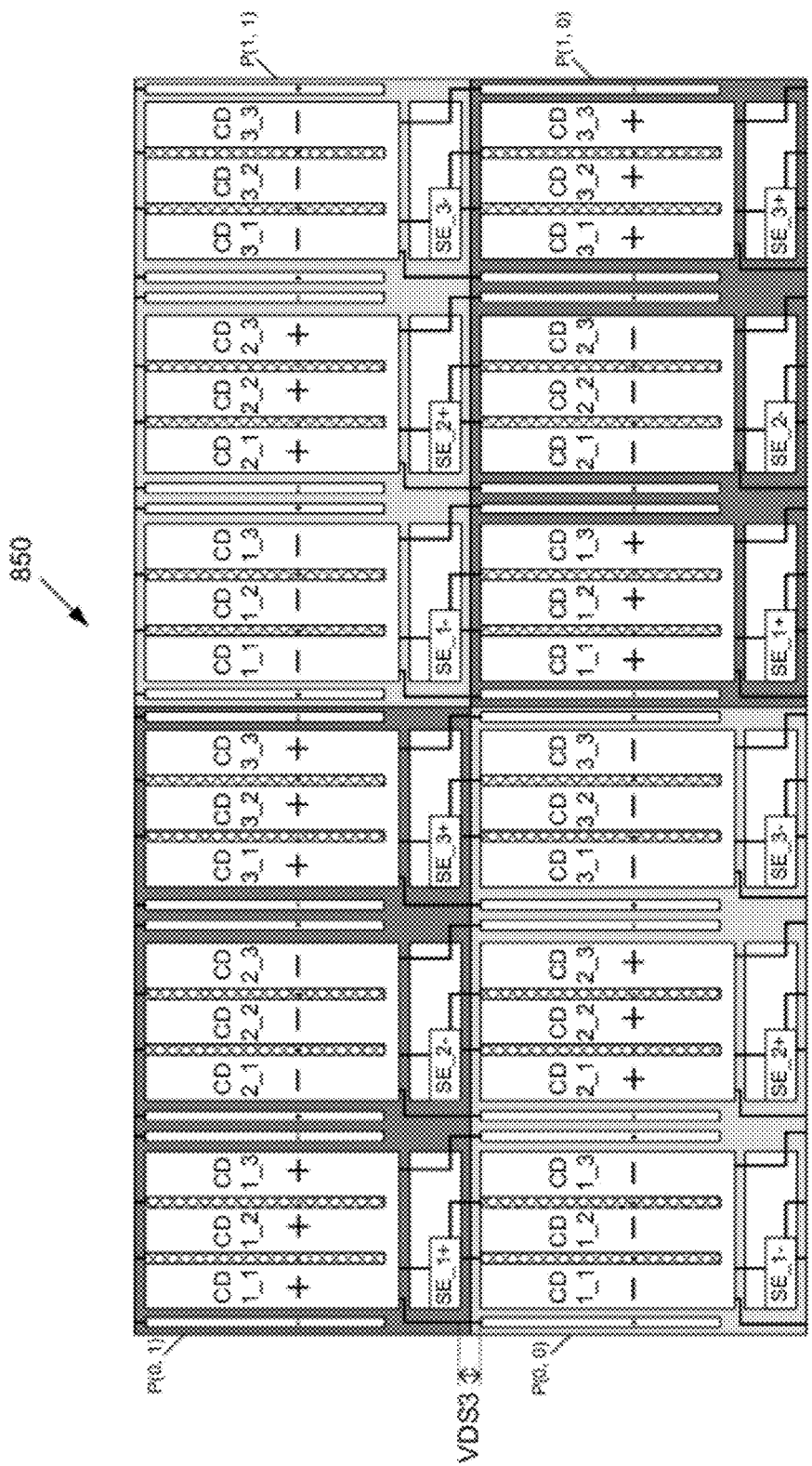

Pixels using pixel design 810 of FIGS. 8(a) and 8(b) can be used in displays using switching element point inversion driving schemes. FIG. 8(c) shows a portion of display 850 using pixels P(0, 0), P(1, 0), P(0, 1), and P(1, 1) of pixel design 810 with a switching element point inversion driving scheme. Display 850 could have thousands of rows with thousand of pixels on each row. The rows and columns would continue from the portion shown in FIG. 8(c) in the manner shown in FIG. 8(c). For clarity, the gate lines and source lines that control the switching elements are omitted in FIG. 8(c). To better illustrate each pixel, the area of each pixel is shaded; this shading is only for illustrative purposes in FIG. 8(c) and has no functional significance. In display 850 the pixels are arranged so that pixels in a row alternate dot polarity patterns (positive or negative) and pixels in a column also alternate between positive and negative dot polarity pattern. Thus, pixels P(0, 1) and P(1, 0) have positive dot polarity pattern and pixels P(0, 0) and P(1, 1) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers and associated dots of a first pixel receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 813 of pixel P(0, 0) and conductor 833 of pixel P(0, 1). Similarly, the electrode of extra-planar fringe field amplifier EPFFA_3_1 of pixel P(0, 0) is coupled to switching elements SE_3 of pixel P(0, 1) via conductor 820 of pixel P(0, 0) and conductor 840 of pixel P(0, 1). Furthermore, as explained above, the polarity of polarized components adjacent to a color dot having a first polarity would have a second polarity.

In a particular embodiment of the present invention, each color dot has a width of 140 micrometers and a height of 420 micrometers. Each extra-planar fringe field amplifier has an extra-planar fringe field amplifier width of 4 micrometers and an extra-planar fringe field amplifier height of 375 micrometers, Horizontal dot spacing HDS1 is 4 micrometers, vertical dot spacing VDS1 is 4 micrometers, vertical dot spacing VDS2 is 4 micrometers, vertical dot spacing VDS3 is 30 micrometers, Horizontal dot spacing HDS1 is 4 micrometers, horizontal dot spacing HDS2 is 25 micrometers, horizontal associated dot spacing HADS1 is 4 micrometers, horizontal associated dot spacing HADS2 is 9 micrometers, associated dot width ADW is 4 micrometers, associated dot height ADH is 375 micrometers, and amplifier depth spacing of 0.4 micrometers.

In another embodiment of the present invention, the associated dots of pixel design 810 are replaced with extra-planar fringe field amplifiers that are located in a plane that is lower than the plane containing the color dots.

Even though, AIFF MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on the top or bottom substrate or both top and bottom substrates to increase viewing angle. Other embodiments may use uniaxial optical compensation films or biaxial optical compensation films with a negative birefringence. In some embodiments, positive compensation films with a parallel optical axis orientation can add to the negative birefringence film with a vertical optical axis orientation. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle. Furthermore, some embodiments of the present invention use black matrix (BM) to cover extra-planar fringe field amplifiers to make the extra-planar fringe field amplifiers opaque. Use of the black matrix improves the contrast ratio of the display and may provide better color performance.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, dot polarity patterns, pixel designs, color components, fringe field amplifying regions, extra planar fringe field amplifiers, vertical amplifying portions, horizontal amplifying portions, polarities, fringe fields, electrodes, substrates, films, and so forth, and use these alternative features to create a method or system according to the principles of this invention. Thus, the invention is limited only by the following claims.

What is claimed is:

1. A display comprising:
a first pixel comprising
 a first first-pixel color component having
  a first first-pixel first-component color dot;
  a second first-pixel first-component color dot aligned with the first first-pixel first-component color dot in a first dimension;
  a third first-pixel first-component color dot aligned with the first first-pixel first-component color dot in a second dimension; and
  a fourth first-pixel first-component color dot aligned with the third first-pixel first-component color dot in the first dimension and aligned with the second first-pixel first-component color dot in the second dimension;
 a first first-pixel extra-planar fringe field amplifier located between the first first-pixel first-component color dot and the second first-pixel first-component color dot; wherein the first first-pixel first-component color dot lies in a first plane and the first first-pixel extra-planar fringe field amplifier lies in a second plane; and
 a first first-pixel switching element coupled to the first first-pixel first-component color dot and the second first-pixel first-component color dot; and a second pixel comprising
 a first second-pixel color component having
  a first second-pixel first-component color dot; and
  a second second-pixel first-component color dot aligned with the first second-pixel first-component color dot in the first dimension;
 a first second-pixel extra-planar fringe field amplifier located between the first second-pixel first-component color dot and the second second-pixel first-component color dot; wherein the first second-pixel first-component color dot lies in the first plane and the first second-pixel extra-planar fringe field amplifier lies in the second plane; and
 a first second-pixel switching element coupled to the first second-pixel first-component color dot and the second second-pixel first-component color dot; and
 wherein the first second-pixel switching element is coupled to the first first-pixel extra-planar fringe field amplifier.

2. The display of claim 1 wherein the first first-pixel switching element is configured to have a first polarity when the first second-pixel switching element is configured to have a second polarity.

3. The display of claim 1, further comprising:
a third pixel comprising
 a first third-pixel color component having
  a first third-pixel first-component color dot; and
  a second third-pixel first-component color dot aligned with the first third-pixel first-component color dot in the first dimension;
 a first third-pixel extra-planar fringe field amplifier located between the first third-pixel first-component color dot and the second third-pixel first-component color dot; wherein the first third-pixel first-component color dot lies in the first plane and the first third-pixel extra-planar fringe field amplifier lies in the second plane; and
 a first third-pixel switching element coupled to the first third-pixel first-component color dot and the second third-pixel first-component color dot; and
 wherein the first third-pixel switching element is coupled to the first second-pixel extra-planar fringe field amplifier.

4. The display of claim 3 wherein the first first-pixel switching element is configured to have a first polarity when the first second-pixel switching element is configured to have a second polarity and wherein the third first-pixel switching element is configured to have the first polarity when the first first-pixel switching element is configured have the first polarity.

5. The display of claim 1, wherein the first pixel further comprises:
a second first-pixel color component having
 a first first-pixel second-component color dot; and
 a second first-pixel second-component color dot aligned with the first first-pixel second-component color dot in the first dimension;
a second first-pixel extra-planar fringe field amplifier located between the first first-pixel second-component color dot and the second first-pixel second-component color dot; wherein the first first-pixel second-component color dot lies in the first plane and the second first-pixel extra-planar fringe field amplifier lies in the second plane; and a second first-pixel switching element coupled to the first first-pixel second-component color dot and the second first-pixel second-component color dot.

6. The display of claim 5, wherein the first pixel further comprises:
a third first-pixel color component having
a first first-pixel third-component color dot; and
a second first-pixel third-component color dot aligned with the first first-pixel third-component color dot in the first dimension;
a third first-pixel extra-planar fringe field amplifier located between the first first-pixel third-component color dot and the second first-pixel third-component color dot; wherein the first first-pixel third-component color dot lies in the first plane and the third first-pixel extra-planar fringe field amplifier lies in the second plane; and
a third first-pixel switching element coupled to the first first-pixel third-component color dot and the second first-pixel third-component color dot.

7. The display of claim 5, further comprising a third first-pixel extra-planar fringe field amplifier located, between the first first-pixel color component and the second first-pixel color component, wherein the third first-pixel extra-planar fringe field amplifier lies in the second plane; and wherein the first second-pixel switching element is coupled to the third first-pixel extra-planar fringe field amplifier.

8. The display of claim 7 wherein the first first-pixel switching element is configured to have a first polarity when the first second-pixel switching element is configured to have a second polarity and wherein the second first-pixel switching element is configured to have the first polarity when the first first-pixel switching element is configured to have the first polarity.

9. The display of claim 5, wherein the second pixel further comprises:
a second second-pixel color component having
a first second-pixel second-component color dot; and
a second second-pixel second-component color dot aligned with the first second-pixel second-component color dot in the first dimension;
a second second-pixel extra-planar fringe field amplifier located between the first second-pixel second-component color dot and the second second-pixel second-component color dot; wherein the first second-pixel second-component color dot lies in the first plane and the second second-pixel extra-planar fringe field amplifier lies in the second plane; and
a second second-pixel switching element coupled to the first second-pixel second-component color dot, the second second-pixel second-component color dot; and the second first-pixel extra-planar fringe field amplifier.

10. The display of claim 5, wherein the first pixel further comprises:
a first first-pixel associated dot; and
a second first-pixel associated dot; wherein the first first-pixel color component lies between the first first-pixel associated dot and the second first-pixel associated dot.

11. The display of claim 10, wherein the first pixel further comprises:
a third first-pixel associated dot; and
a fourth first-pixel associated dot; wherein the second first-pixel color component lies between the third first-pixel associated dot and the fourth first-pixel associated dot and wherein the third first-pixel associated dot lies between the second first-pixel associated dot and the second first-pixel color component.

12. The display of claim 1, wherein the first first-pixel extra-planar fringe field amplifier further comprises:
a first-pixel first-component vertical amplifying portion extending between the first first-pixel first-component color dot and the second first-pixel first-component color dot and between the third first-pixel first-component color dot and the fourth first-pixel first-component color dot;
a first first-pixel first-component horizontal amplifying portion extending between the first first pixel first-component color dot and the third first-pixel first-component color dot; and
a second first-pixel first-component horizontal amplifying portion extending between the second first-pixel first-component color dot and the fourth first-pixel first-component color dot.

13. The display of claim 12, wherein the first second-pixel color component further comprises:
a third second-pixel first-component color dot aligned with the first second-pixel first-component color dot in a second dimension; and
a fourth second-pixel first-component color dot aligned with the third second-pixel first-component color dot in the first dimension and aligned with the second second-pixel first-component color dot in the second dimension.

14. The display of claim 13, wherein the first second-pixel extra-planar fringe field amplifier further comprises:
a second-pixel first-component vertical amplifying portion extending between the first second-pixel first-component color dot and the second second-pixel first-component color dot and between the third second-pixel first-component color dot and the fourth second-pixel first-component color dot;
a first second-pixel first-component horizontal amplifying portion extending between the first first pixel first-component color dot and the third second-pixel first-component color dot; and
a second second-pixel first-component horizontal amplifying portion extending between the second second-pixel first-component color dot and the fourth second-pixel first-component color dot.

15. The display of claim 12,
wherein the first first-pixel color component further comprises:
a fifth first-pixel first-component color dot aligned with the third first-pixel first-component color dot in the second dimension;
a sixth first-pixel first-component color dot aligned with the fifth first-pixel first-component color dot aligned in the first dimension and aligned with the fourth first-pixel first-component color dot in the second dimension; and
wherein the first first-pixel extra-planar fringe field amplifier further comprises:
a third first-pixel first-component horizontal amplifying portion extending between the fifth first-pixel first-component color dot and the third first-pixel first-component color dot; and
a fourth first-pixel first-component horizontal amplifying portion extending between the sixth first-pixel first-component color dot and the fourth first-pixel first-component color dot; and wherein the first-pixel first-component vertical amplifying portion extends between the fifth first-pixel first-component color dot and the sixth first-pixel first-component color dot.

16. The display of claim 15,
wherein the first first-pixel color component further comprises:
- a seventh first-pixel first-component color dot aligned with the fifth first-pixel first-component color dot in the second dimension;
- an eighth first-pixel first-component color dot aligned with the seventh first-pixel first-component color dot in the first dimension in the first dimension and aligned with the sixth first-pixel first-component color dot in the second dimension; and wherein the first first-pixel extra-planar fringe field amplifier further comprises:
- a fifth first-pixel first-component horizontal amplifying portion extending between the fifth first-pixel first-component color dot and the seventh first-pixel first-component color dot; and
- a sixth first-pixel first-component horizontal amplifying portion extending between the sixth first-pixel first-component color dot and the eighth first-pixel first-component color dot; and
- wherein the first-pixel first-component vertical amplifying portion extends between the seventh first-pixel first-component color dot and the eighth first-pixel first-component color dot.

17. The display of claim 12, wherein the first pixel further comprises:
- a second first-pixel color component having
  - a first first-pixel second-component color dot; and
  - a second first-pixel second-component color dot aligned with the first first-pixel second-component color dot in the first dimension;
  - a third first-pixel second-component color dot aligned with the first' first-pixel second-component color dot in the second dimension; and
  - a fourth first-pixel second-component color dot aligned with the third first-pixel second-component color dot in the first dimension and aligned with the second first-pixel second-component color dot in the second dimension; and
- a second first-pixel extra-planar fringe field amplifier having
  - a first-pixel second-component vertical amplifying portion extending between the first first-pixel second-component color dot and the second first-pixel second-component color dot and between the third first-pixel second-component color dot and the fourth first-pixel second-component color dot;
  - a first first-pixel second-component horizontal amplifying portion extending between the first first-pixel second-component color dot and the third first-pixel second-component color dot; and
  - a second first-pixel second-component horizontal amplifying portion extending between the second first-pixel second-component color dot and the fourth first-pixel second-component color dot.

18. The display of claim 17, further comprising:
a second first-pixel switching element coupled to the second first-pixel color component; and
wherein the first first-pixel switching element is configured to have a first polarity when the second first-pixel switching element is configured to have a second polarity.

19. The display of claim 17, wherein the first pixel further comprises:
- a third first-pixel color component having
  - a first first-pixel third-component color dot; and
  - a second first-pixel third-component color dot aligned with the first first-pixel third-component color dot in the first dimension;
  - a third first-pixel third-component color dot aligned with the first first-pixel third-component color dot in the second dimension; and
  - a fourth first-pixel third-component color dot aligned with the third first-pixel third-component color dot in the first dimension and aligned with the second first-pixel third-component color dot in the second dimension; and
- a third first-pixel extra-planar fringe field amplifier having
  - a first-pixel third-component vertical amplifying portion extending between the first first-pixel third-component color dot and the second first-pixel third-component color dot and between the third first-pixel third-component color dot and the fourth first-pixel third-component color dot;
  - a first first-pixel third-component horizontal amplifying portion extending between the first first-pixel third-component color dot and the third first-pixel third-component color dot; and
  - a second first-pixel third-component horizontal amplifying portion extending between the second first-pixel third-component color dot and the fourth first-pixel third-component color dot.

20. The display of claim 19,
a second first-pixel switching element coupled to the second first-pixel color component;
a third first-pixel switching element coupled to the third first-pixel color component; and
wherein the first first-pixel switching element and third first-pixel switching element are configured to have a first polarity when the second first-pixel switching element is configured to have a second polarity.

* * * * *